United States Patent
He et al.

(10) Patent No.: US 10,469,904 B2
(45) Date of Patent: *Nov. 5, 2019

(54) POWER AWARE ADAPTATION FOR VIDEO STREAMING

(71) Applicant: InterDigital Patent Holdings, Inc., Wilmington, DE (US)

(72) Inventors: Yuwen He, San Diego, CA (US); Markus Kunstner, Klagenfurt (AT); Yan Ye, San Diego, CA (US); Ralph Neff, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,881

(22) Filed: Jul. 18, 2018

(65) Prior Publication Data

US 2018/0324488 A1 Nov. 8, 2018

Related U.S. Application Data

(63) Continuation of application No. 14/773,078, filed as application No. PCT/US2014/020999 on Mar. 6, 2014, now Pat. No. 10,063,921.

(Continued)

(51) Int. Cl.
*H04N 19/103* (2014.01)
*H04N 19/115* (2014.01)
(Continued)

(52) U.S. Cl.
CPC ... *H04N 21/4424* (2013.01); *H04N 21/23439* (2013.01); *H04N 21/26258* (2013.01);
(Continued)

(58) Field of Classification Search
CPC .. H04N 19/103; H04N 19/115; H04N 19/146; H04N 19/157
(Continued)

(56) References Cited

U.S. PATENT DOCUMENTS 9,438,902 B2    9/2016  Guo et al.
2003/0142087 A1 7/2003  Shiotsu et al.
(Continued)

FOREIGN PATENT DOCUMENTS

CN    1522074 A    8/2004
CN  101223490 A    7/2008
(Continued)

OTHER PUBLICATIONS

Android Developers, "Battery Manager", Available at http://developer.android.com/reference/androids/os/BatteryManager.html, retrieved on May 24, 2017, 8 pages.
Bross et al., "High Efficiency Video Coding (HEVC) Text Specification Draft 10", JCTVC-L1003, 12th Meeting: Geneva, CH, Jan. 14-23, 2013, 321 pages.
(Continued)

*Primary Examiner* — Dominic D Saltarelli
(74) *Attorney, Agent, or Firm* — Condo Roccia Koptiw LLP

(57) ABSTRACT

Power aware adaptation for a power aware video streaming system may be based on the complexity information conveyed in different ways. A complexity level of a data stream, such as a video data stream, may be selected as a function of a remaining battery power of a wireless transmit/receive unit (WTRU) and on a state set of a plurality of state sets that may be stored and/or managed by the WTRU. These state sets may correspond to, for example, different content sources and/or different complexity estimation algorithms and may be used to select the complexity level of the data stream. The data stream may then be received at the selected complexity level. The complexity level and/or a bitrate of the data stream may be adapted to accommodate, for (Continued)

example, the remaining battery power and/or other circumstances. The adapation may be customized according to the objectives of use cases.

20 Claims, 18 Drawing Sheets

Related U.S. Application Data

(60) Provisional application No. 61/936,828, filed on Feb. 6, 2014, provisional application No. 61/773,379, filed on Mar. 6, 2013.

(51) Int. Cl.

| | |
|---|---|
| *H04N 19/146* | (2014.01) |
| *H04N 19/157* | (2014.01) |
| *H04N 21/442* | (2011.01) |
| *H04N 21/2343* | (2011.01) |
| *H04N 21/443* | (2011.01) |
| *H04N 21/462* | (2011.01) |
| *H04N 21/845* | (2011.01) |
| *H04N 21/262* | (2011.01) |
| *H04N 21/41* | (2011.01) |
| *H04N 21/482* | (2011.01) |
| *H04N 21/643* | (2011.01) |
| *H04N 21/414* | (2011.01) |
| *H04N 21/8543* | (2011.01) |
| *H04N 21/24* | (2011.01) |

(52) U.S. Cl.
CPC ... *H04N 21/4126* (2013.01); *H04N 21/41407* (2013.01); *H04N 21/4436* (2013.01); *H04N 21/4621* (2013.01); *H04N 21/4825* (2013.01); *H04N 21/64322* (2013.01); *H04N 21/8456* (2013.01); *H04N 21/8543* (2013.01); *H04N 21/2402* (2013.01)

(58) Field of Classification Search
USPC .................................................. 375/240–241
See application file for complete search history.

(56) References Cited

U.S. PATENT DOCUMENTS

| | | |
|---|---|---|
| 2004/0158878 A1 | 8/2004 | Ratnakar et al. |
| 2009/0055530 A1 | 2/2009 | Pince et al. |
| 2009/0210654 A1 | 8/2009 | Koul et al. |
| 2010/0189183 A1 | 7/2010 | Gu et al. |
| 2012/0141089 A1 | 6/2012 | Hunt |
| 2013/0101015 A1 | 4/2013 | He et al. |
| 2013/0287095 A1 | 10/2013 | Guo et al. |
| 2016/0285940 A1 | 9/2016 | He et al. |

FOREIGN PATENT DOCUMENTS

| | | |
|---|---|---|
| CN | 102547272 A | 7/2012 |
| CN | 102860008 A | 1/2013 |
| JP | 2003-199002 A | 7/2003 |
| JP | 2003-219296 A | 7/2003 |
| JP | 2004-242308 A | 8/2004 |
| JP | 2008-294701 A | 12/2008 |
| JP | 2011-015243 A | 1/2011 |
| KR | 10-2008-0110787 A | 12/2008 |
| KR | 10-2011-0106419 A | 9/2011 |
| KR | 10-2012-0139514 A | 12/2012 |
| WO | WO 2011/047335 A1 | 4/2011 |
| WO | WO 2011/084913 A2 | 7/2011 |
| WO | WO 2012/089078 A1 | 7/2012 |
| WO | WO 2014/011622 A2 | 1/2014 |

OTHER PUBLICATIONS

Carroll et al., "An Analysis of Power Consumption in a Smartphone", NICTA and University of New South Wales, USENIX Annual Technical Conference, 2010, 14 pages.

Cho et al., "A Combined Approach for QoS-Guaranteed and Low-Power Video Decoding", IEEE Transactions on Consumer Electronics, vol. 57, No. 2, May 2011, pp. 651-657.

Cisco, "Cisco Visual Networking Index: Global Mobile Data Traffic Forecast Update, 2011-2016", White Paper, Feb. 14, 2012, pp. 1-29.

Deshpande et al., "System Level Power Allocation Algorithm for Mobile Devices for Full Playback Guarantee", Sharp Laboratories of America, Camas, Nov. 29, 2011, pp. 19-20.

Fernandes et al., "Draft Call for Proposals on Green MPEG", MPEG Document-M28249, Geneva, Jan. 2013.

He et al., "Power Aware HEVC Streaming for Mobile", Visual Communications and Image Processing (VCIP), Nov. 17, 2013, 5 pages.

ISO/IEC, "Information Technology—Dynamic Adaptive Streaming over HTTP (DASH)—Part 1: Media Presentation Description and Segment Formats", ISO/IEC 23009-1:2012, Apr. 2012, 2 pages.

ITUT-T, "Advanced Video Coding for Generic Audiovisual Services", ITU-T Rec H.264 and ISO/IEC/MPEG 4 part 10, Nov. 2007, 563 pages.

Kennedy et al., "Dynamic Stream Control for Energy Efficient Video Streaming", IEEE International Symposium on Broadband Multimedia Systems and Broadcasting (BMSB), Jun. 2011, 6 pages.

Ma et al., "Draft Requirements and Discussion on Green MPEG", 103, MPEG Meeting, m27770, Geneva, CH, Jan. 2013, 8 pages.

Park et al., "Proposed Text of Working Draft for MPEG Media Transport", Document No. ISO/IEC JTC1/SC29/WG11/N12690, Apr. 2012, Geneva, Switzerland, Apr. 2012.

Stockhammer, Thomas, "Dynamic Adaptive Streaming over HTTP—Standards and Design Principles", Proceedings of the Second Annual ACM Conference on Multimedia Systems New York, NY, USA: ACM Press, Feb. 2011, 11 pages.

Sueur et al., "Dynamic Voltage and Frequency Scaling: The Laws of Diminishing Returns", HotPower'10 Proceedings of the International Conference on Power Aware Computing and Systems, Vancouver, BC, Canada, 2010, 5 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Sullivan et al., "Rate-Distortion Optimization for Video Compression", Signal Processing Magazine, IEEE, vol. 15, No. 6, Nov. 1998, pp. 74-90.

Sultan et al., "Power Aware Decoding of a Scalable Video Bit-Stream", International Symposium on Performance Evaluation of Computer & Telecommunication Systems (SPECTS), vol. 41, Jul. 2009, 6 pages.

Sun et al., "Energy-Aware Video Streaming System with QoS Adaptation Based on Inter-Segment Priorities", Journal of Information Processing Society of Japan, vol. 46, No. 2, Feb. 2005, 10 pages.

Tamai et al., "Energy-Aware QoS Adaptation for Streaming Video Based on MPEG-7", IEEE International Conference on Multimedia and Expo, vol. 1, Jun. 2004, 4 pages.

Tamai et al., "Low Power Video Streaming for PDAs", Proceedings of the 8th IEEE International Workshop on Mobile Multimedia Communications, Oct. 2003, 6 pages.

Trestian et al., "Energy Consumption Analysis of Video Streaming to Android Mobile Devices", 2012 IEEE Network Operations and Management Symposium (NOMS 2012), Apr. 16-20, 2012, pp. 444-452.

Yamagishi et al., "Improvement of Quality Signaling by an Extension of Sidx Box", Sony Corporation, ISO/IEC JTC1/SC29/WG11 MPEG2012/m28215, Geneva, Switzerland, Jan. 2013, 3 pages.

Zhang et al., "Out of Band Signalling for Quality Driven Adaptation", ISO/IEC JTC1/SC29/WG11 MPEG2013/m28169, Geneva, Switzerland, Jan. 2013, 3 pages.

US 10,469,904 B2

POWER AWARE ADAPTATION FOR VIDEO STREAMING

CROSS REFERENCE TO RELATED APPLICATIONS

This application is a Continuation Application of U.S. patent application Ser. No. 14/773,078, filed Sep. 4, 2015, which is the National Stage Entry under 35 U.S.C. § 371 of Patent Cooperation Treaty Application No. PCT/US2014/020999, filed Mar. 6, 2014, which claims the benefit of U.S. provisional application 61/773,379, filed on Mar. 6, 2013; and the benefit of U.S. provisional application 61/936,828, filed on Feb. 6, 2014; the contents of both applications are hereby incorporated by reference herein.

BACKGROUND

The computation capability of mobile devices has increased in terms of CPU frequency, number of CPU cores and memory size. With the advances of Systems on Chip (SoC) and wireless communication technologies (e.g., 4G and WiFi), the mobile platform has a valuable role in society; the number of mobile users is increasing, and mobile devices have taken roles beyond making voice calls. For example, a user may use a mobile device to access a service at any time and at any place.

Video streaming is an often requested video service for mobile platforms operating in a wireless network. There may be many challenges to offering high quality video services on resource-constrained and heterogeneous mobile devices. These challenges may include varying network conditions, varying display sizes, varying processing capabilities, and battery life.

SUMMARY

Power aware adaptation for a power aware video streaming system may be based on complexity information, which may be conveyed in a number of ways. A complexity level of a data stream, such as a video data stream, may be selected as a function of a remaining battery power of a wireless transmit/receive unit (WTRU) and on a state set of a plurality of state sets that may be stored and/or managed by the WTRU. These state sets may correspond to, for example, different content sources and/or different complexity estimation algorithms and may be used to select the complexity level of the data stream. The data stream may then be received at the selected complexity level. The complexity level and/or a bitrate of the data stream may be adapted to accommodate, for example, the remaining battery power and/or other circumstances. The adaptation may be customized according to the objectives of use cases.

To reduce the amount of memory that may be used in a tracking state set, a decoder device, such as a WTRU, may set a limit on the number of state sets it may track and may delete state sets when this limit may be exceeded. The decoder device may merge state sets that may be similar, and/or may quantize complexity levels to power dissipation rate (PDR) states.

A device for power aware streaming may be provided. The device may include a processor that may perform a number of actions. A complexity level for a data segment may be determined. For example, the complexity for the data segment may be received from a server or via a signal. The data segment may be a segment of a video stream. For example, the processor may determine a complexity level for a data segment that may be used by a decoder. The PDR for the complexity level may be based on a power that may be dissipated while decoding the data segment. The PDR for the complexity level may be determined using a first battery level and a second battery level. A state, such as a PDR state, may be calculated using the PDR. A second PDR may be determined for the complexity level.

The state, such as the PDR state for the complexity level, may be calculated using a first PDR and a second PDR. For example, the PDR state may be calculated by calculating a weighted average of the first PDR and the second PDR. As another example, the PDR state may be calculated by calculating a first weighted PDR by applying a first weight to the first PDR; calculating a second weighted PDR by applying a second weight to the second PDR; and setting the PDR state to the average of the first weighted PDR and the second weighted PDR.

An amount of power to play a video stream may be determined. For example, the length or duration of the video stream may be determined. The power needed to play the video stream at a complexity level may be calculated by multiplying the length or duration of the video stream by the PDR (e.g. the PDR state) for the complexity level.

A remaining battery capacity may be determined. The power that may be used to decode and/or play a video stream at a complexity level may be determined. A determination may be made as to whether the power may exceed the remaining battery capacity. If the power may exceed the remaining battery capacity, another complexity level may be used to decode and play the video stream within the remaining battery capacity.

A device for power aware streaming may be provided. The device may include a processor that may be configured to perform a number of actions. For example, a first complexity level may be determined for a data segment. The complexity level for a data segment may be determined by receiving the complexity level from a server or via a signal. A computing load for a decoder may be determined. A computing threshold may be determined. The computing threshold may be set by a user. It may be determined that the computing load may be above or below the computing threshold. A second complexity level may be selected using the computing load. A bit rate may be determined for the data segment.

The Summary is provided to introduce a selection of concepts in a simplified form that are further described in the Detailed Description. This Summary is not intended to identify key or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1:
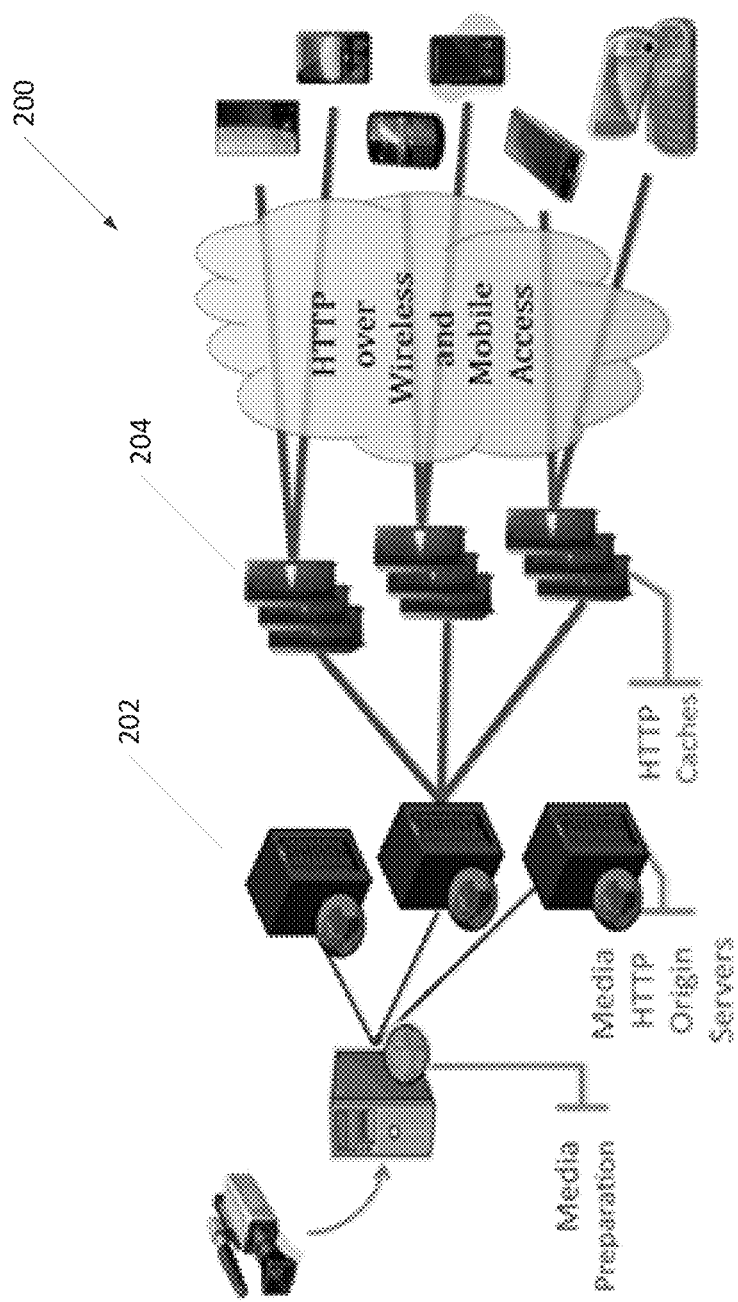
FIG. 1 depicts an example HTTP-based video streaming system.

A detailed description of illustrative examples will now be described with reference to the various Figures. Although this description provides a detailed example of possible implementations, it should be noted that the details are intended to be exemplary and in no way limit the scope of the application.

Power aware adaptation for a power aware video streaming system may be based on complexity information, which may be conveyed in a number of ways. A complexity level of a data stream, such as a video data stream, may be selected as a function of a remaining battery power of a wireless transmit/receive unit (WTRU) and on a state set of a plurality of state sets that may be stored and/or managed by the WTRU. These state sets may correspond to, for example, different content sources and/or different complexity estimation algorithms and may be used to select the complexity level of the data stream. The data stream may then be received at the selected complexity level. The complexity level and/or a bitrate of the data stream may be adapted to accommodate, for example, the remaining battery power and/or other circumstances. The adaptation may be customized according to the objectives of use cases.

To reduce the amount of memory that may be used in a tracking state set, a decoder device, such as a WTRU, may set a limit on the number of state sets it may track and may delete state sets when this limit may be exceeded. The decoder device may merge state sets that may be similar, and/or may quantize complexity levels to power dissipation rate (PDR) states.

A device for power aware streaming may be provided. The device may include a processor that may perform a number of actions. A complexity level for a data segment may be determined. For example, the complexity for the data segment may be received from a server or via a signal. The data segment may be a segment of a video stream. For example, the processor may determine a complexity level for a data segment that may be used by a decoder. The PDR for the complexity level may be based on a power that may be dissipated while decoding the data segment. The PDR for the complexity level may be determined using a first battery level and a second battery level. A state, such as a PDR state, may be calculated using the PDR. A second PDR may be determined for the complexity level.

The state, such as the PDR state for the complexity level, may be calculated using a first PDR and a second PDR. For example, the PDR state may be calculated by calculating a weighted average of the first PDR and the second PDR. As another example, the PDR state may be calculated by calculating a first weighted PDR by applying a first weight to the first PDR; calculating a second weighted PDR by applying a second weight to the second PDR; and setting the PDR state to the average of the first weighted PDR and the second weighted PDR.

An amount of power to play a video stream may be determined. For example, the length or duration of the video stream may be determined. The power needed to play the video stream at a complexity level may be calculated by multiplying the length or duration of the video stream by the PDR (e.g. the PDR state) for the complexity level.

A remaining battery capacity may be determined. The power that may be used to decode and/or play a video stream at a complexity level may be determined. A determination may be made as to whether the power may exceed the remaining battery capacity. If the power may exceed the remaining battery capacity, another complexity level may be used to decode and play the video stream within the remaining battery capacity.

A device for power aware streaming may be provided. The device may include a processor that may be configured to perform a number of actions. For example, a first complexity level may be determined for a data segment. The complexity level for a data segment may be determined by receiving the complexity level from a server or via a signal. A computing load for a decoder may be determined. A computing threshold may be determined. The computing threshold may be set by a user. It may be determined that the computing load may be above or below the computing threshold. A second complexity level may be selected using the computing load. A bit rate may be determined for the data segment.

As described herein, power adaptation may be performed at the client side. For example, power adaptation may be applied in a power aware streaming system. Power dissipation states may be tracked, maintained, and used by a decoder device, such as a WTRU. For example, content providers or content sources may use different algorithms to estimate complexity of content, which may be related to the power dissipation associated with decoding the content. A decoder device may recognize and adapt to these different algorithms.

Video streaming may be a requested video service for mobile platforms that may operate in a wireless network. There may be challenges to offering quality video services on mobile devices that may be resource-constrained. For example, network conditions may vary, display sizes may vary, and processing capabilities may vary, and there may be a battery life. Many service providers adopt dynamic adaptive streaming over HTTP (DASH) solutions because they may allow the service providers to reuse the existing network infrastructures, especially CDN networks, and may traverse firewalls. For example, EdgeCast and Level 3 use Smooth Streaming from Microsoft, whereas Akamai and CloudFront use Dynamic HTTP Streaming from Adobe. iOS devices may support Apple's HTTP Live Streaming.

In DASH, media may be organized into segments that may be decodable. The content may be encoded at different qualities or resolutions and may be chopped into segments. The information of those contents, such as bitrate, byte range, and URL, may be described with a XML-based manifest file (MF) called a Media Presentation Description (MPD). The client may access this content through HTTP and may select the segments that may fulfill its bandwidth or resolution criteria according to the MPD file.

FIG. 1 depicts an example HTTP-based video streaming system, such as system 200. Captured content may be compressed and may be chopped into small segments. For example, segments may be between 2 and 10 seconds long in some streaming systems. At 202, the segments may be stored in one or more HTTP streaming servers and/or distributed via content delivery network (CDN). At the beginning of a streaming session, the client may request and receive a MPD file from a HTTP streaming server at 202. The client may decide which segments to request according to its capabilities, such as its display resolution and the available bandwidth. The client may request the appropriate segments from a server at 202, which may send the video segments to the client per its request. The segments transmitted via HTTP may be cached in a HTTP cache server or servers at 204. This may allow cached segments to be reused for other users, and may allow the system to provide streaming service on a large scale.

Figure 2:
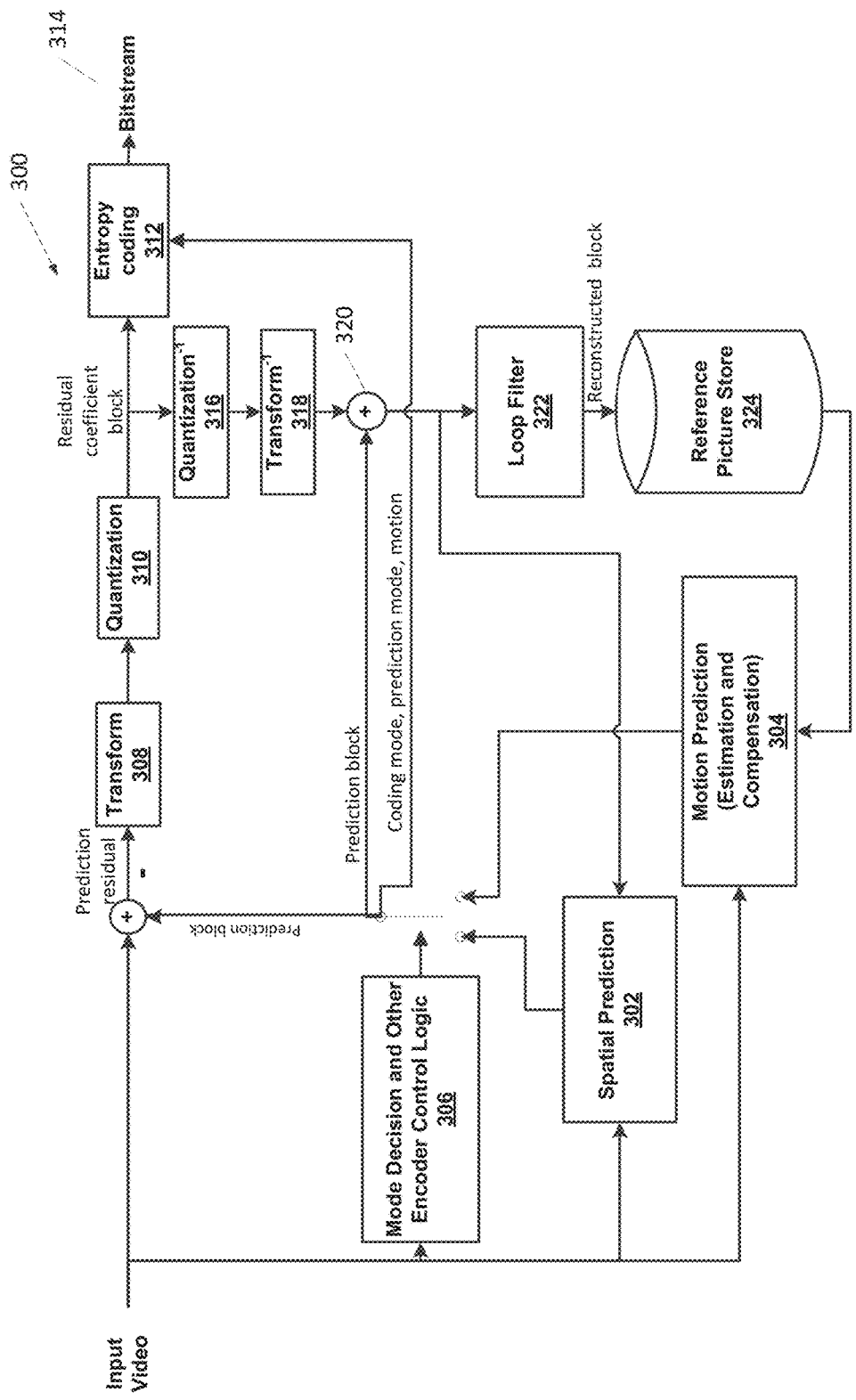
FIG. 2 depicts an example block-based video encoder.

In some streaming systems, to save transmission bandwidth and storage, single layer video coding may be used to compress the video content and to generate different bitstreams. FIG. 2 is a block diagram illustrating an example block-based layer video encoder 300 that may be used to generate bitstreams for a streaming system, such as streaming system 200. To achieve efficient compression, a single layer encoder may employ, for example, spatial prediction (which may be referred to as intra prediction) at 302 and/or temporal prediction (which may be referred to as inter prediction and/or motion compensated prediction) at 304 to predict the input video signal. The encoder may also have mode decision logics 306 that may choose a form (e.g., the most suitable form) of prediction, for example, based on certain criteria, such as a combination of rate and distortion considerations. The encoder may transform at 308 and quantize at 310 the prediction residual (which may be the difference signal between the input signal and the prediction signal). The quantized residual, together with the mode information (e.g., intra or inter prediction) and prediction information (such as motion vectors, reference picture indexes, intra prediction modes, etc.) may be further compressed at an entropy coder 312 and packed into an output video bitstream 314. As shown in FIG. 2, the encoder may also generate the reconstructed video signal by applying inverse quantization at 316 and inverse transform at 318 to the quantized residual to obtain a reconstructed residual, and adding it back to the prediction signal at 320. The reconstructed video signal may go through a loop filter process 322, for example, deblocking filter, Sample Adaptive Offsets, or Adaptive Loop Filters, and may be stored in a reference picture store 324 that may be used to predict a video signal.

Figure 3:
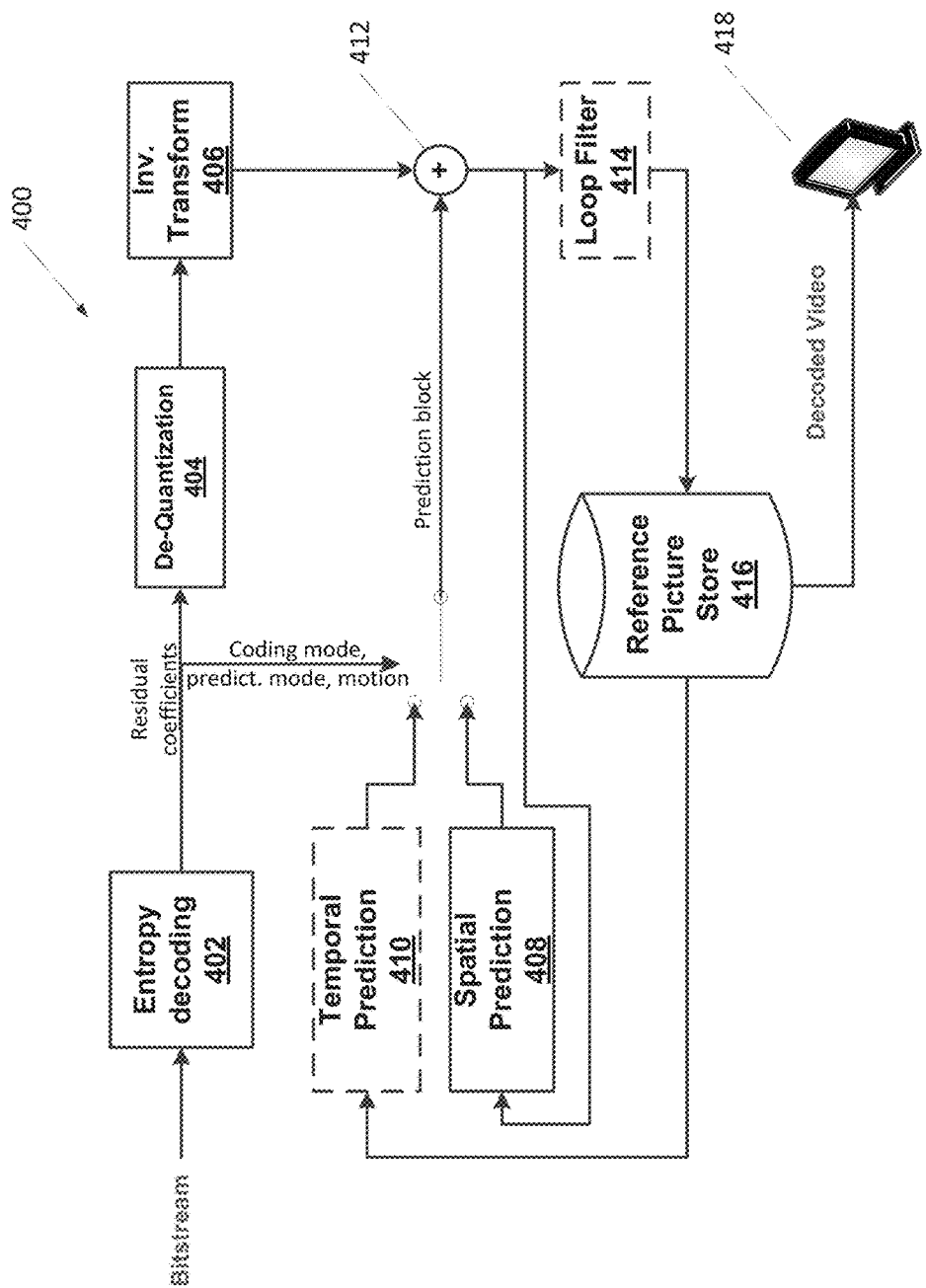
FIG. 3 depicts example block-based video decoder.

FIG. 3 is a block diagram of an example block-based single layer decoder 400 that may receive a video bitstream produced by an encoder, such as encoder 300, and may reconstruct the video signal to be displayed. At the decoder 400, the bitstream may be parsed by an entropy decoder 402. The residual coefficients may be inverse quantized at 404 and inverse transformed at 406 to obtain a reconstructed residual. The coding mode and prediction information may be used to obtain the prediction signal using spatial prediction 408 and/or temporal prediction 410. The prediction signal and the reconstructed residual may be added together at 412 to get a reconstructed video. The reconstructed video may go through loop filtering at 414, may be stored in a reference picture store 416, may be displayed at 418, and/or may be used to decode a video signal. A number of video coding standards that may use a block-based encoder, such as encoder 300, and a decoder, such as decoder 400, include MPEG-2 Video, MPEG4 Visual, H.264/AVC, and HEVC.

Figure 4:
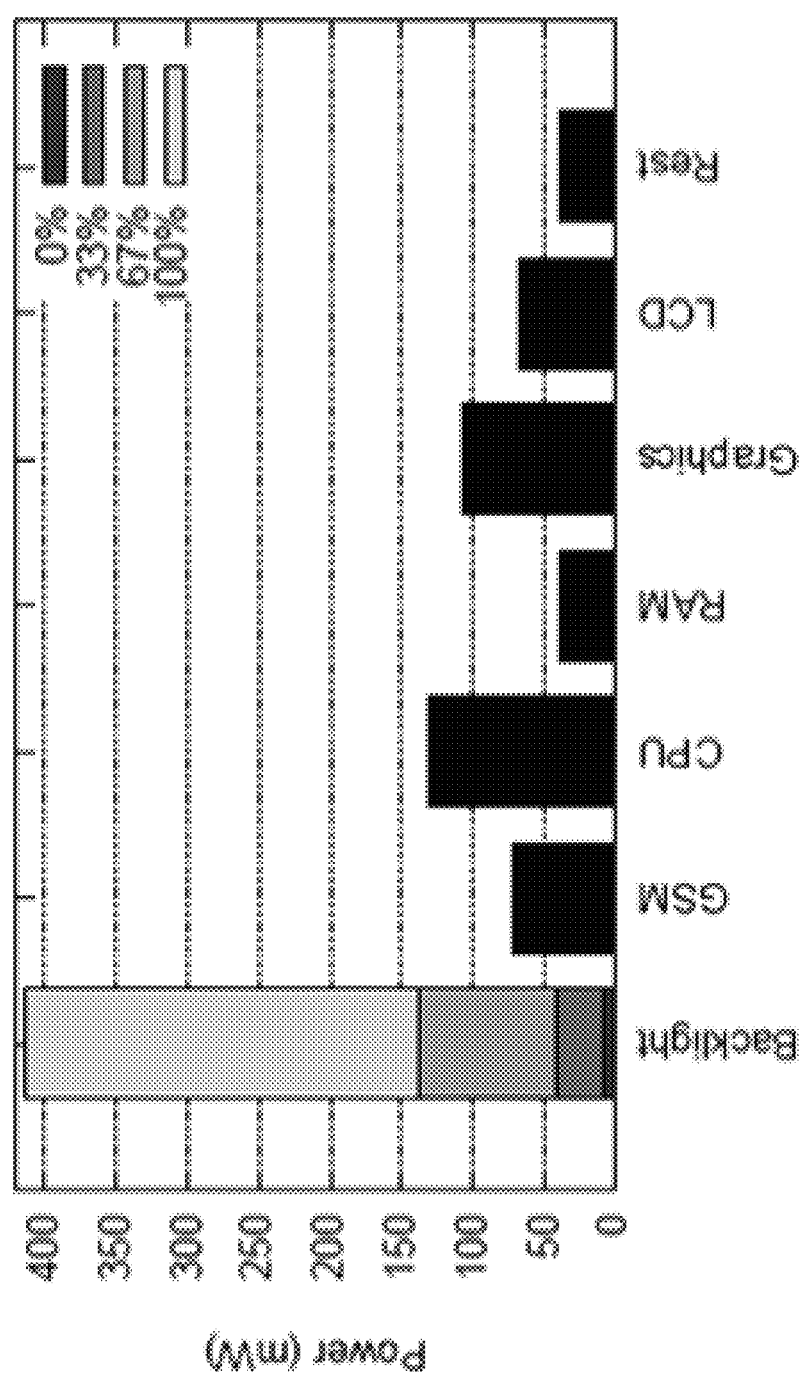
FIG. 4 depicts an example of power usage in an example video playback scenario.

The power endurance of mobile devices may affect application performance. Power usage for a reference mobile platform may be analyzed under various conditions. For example, power consumption of components, e.g., processor, display, internal and external memory, and radio (e.g., GSM/3G/4G/WiFi), may be evaluated. In different applications, power consumption percentages among those parts may be different. For example, video playback may be an intensive power consumption application as it may involve both computation and memory access. Moreover, video playback may display the pictures with sufficient luminance levels, which may also consume much power. FIG. 4 depicts an example of power usage in an example video playback scenario in which CPU, graphics, and display (backlight and LCD) parts may consume power.

Power saving approaches may adaptively switch working modes according to system status. For example, when the system status may be idle, the device processor may transition to a low power state, keeping requested modules working to reduce power consumption. Other power saving approaches may switch the processor's frequency adaptively. For example, when the processor's frequency decreases, the voltage of a power supply may also decrease to reduce power consumption. The power dissipated by a chip may be formulated as:

$$P=CV^2f$$

where C is the capacitance, V is the voltage and f is the switching frequency. The frequency of the processor may be configured for different tasks. For example, because decoding complexity may be different for a picture, a processor's clock frequency may be reduced when decoding easier to decode pictures. An encoded picture size may be used to estimate a picture's decoding time. The processor frequency may be decreased, for example, when the estimated picture decoding time may be less than the picture duration. To provide full-length video playback on mobile devices, power may be allocated among different modules, such as the display, the decoding module, etc. For example, a client device may decrease the luminance of display and/or skip some frame decoding if the system determines that the remaining power may not be sufficient to play the remaining video.

Improving power usage efficiency to prolong the battery endurance and to provide full-length video playback may promote delivering a satisfactory user experience of video streaming applications on mobile platforms. However, some streaming systems, such as DASH, may focus on network bandwidth variation, but may not consider power usage issues in their design. Power saving methods may be client side technologies and may prevent full-length playback even at the cost of frame dropping and/or motion jerkiness. Power saving issues for mobile devices may be addressed based on power aware computing. For example, the server and the client may collaborate. For example, the server may prepare the video content with power consumption considerations, and the client may subscribe to presentations with different complexities according to the available bandwidth, remaining battery, and remaining video playback time.

Clients may try to decode and playback video after they receive the video segments from the server. For a software decoder, decoding and playback may occupy a portion of the processor's resources to meet time criterion. Methods may be used to prevent the processor's resources from becoming burdened, which may prevent the client from becoming unable to playback video smoothly when the processor struggles to decode it in real time. For example, methods may be used to prevent the client from dropping frames or presenting asynchronous audio and video. As another example, methods may allow an improvement of the system's response time in a multi-task oriented environment.

Power aware adaptation methods may be used by a power aware adaptation control module in a power aware video streaming system. These power aware adaptation methods may achieve power savings and/or better processor load balancing. Power adaptation may be implemented at the client side, which may be applied in power aware streaming systems.

Figure 5:
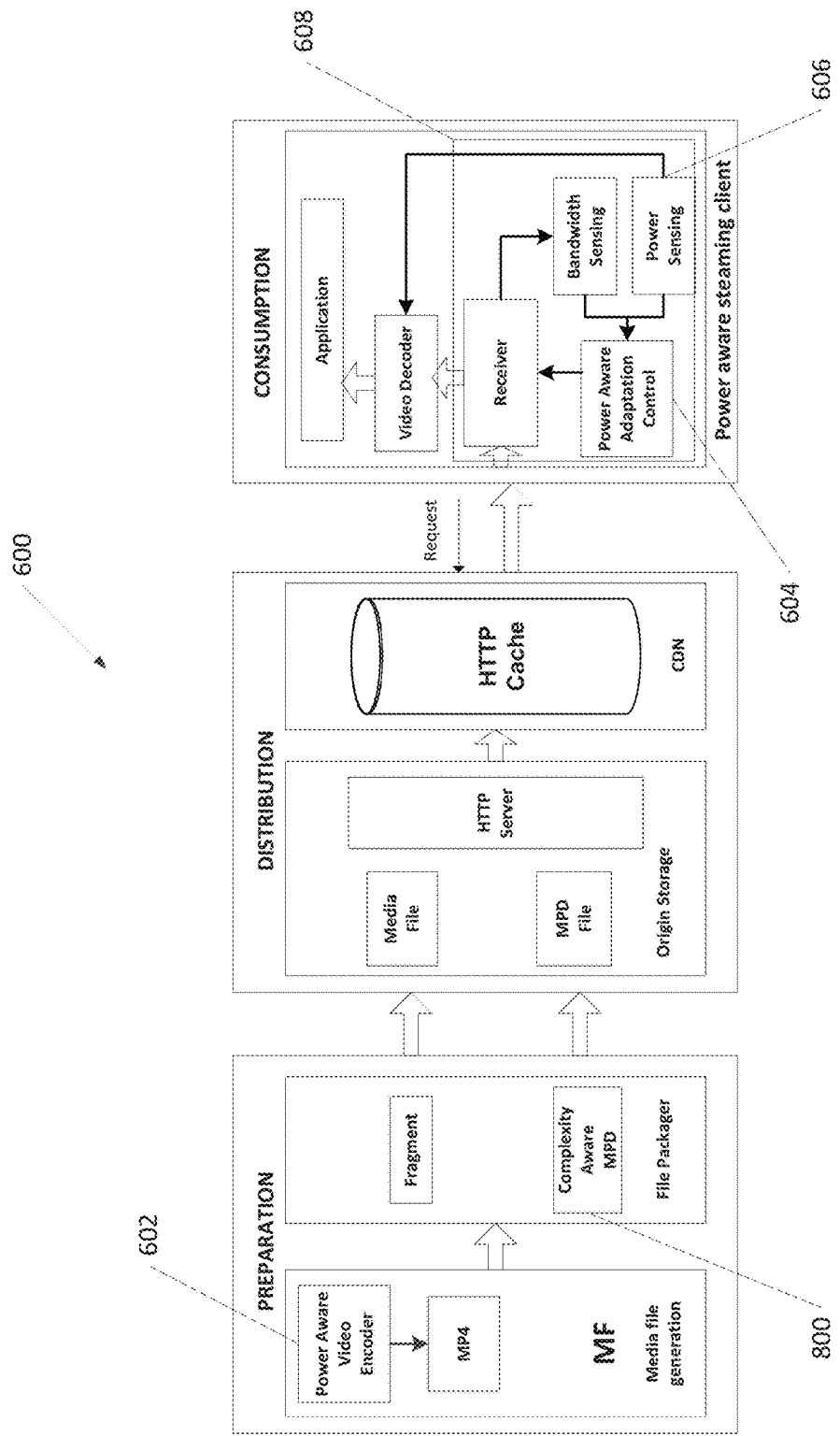
FIG. 5 depicts an example power aware streaming system.
Figure 6:
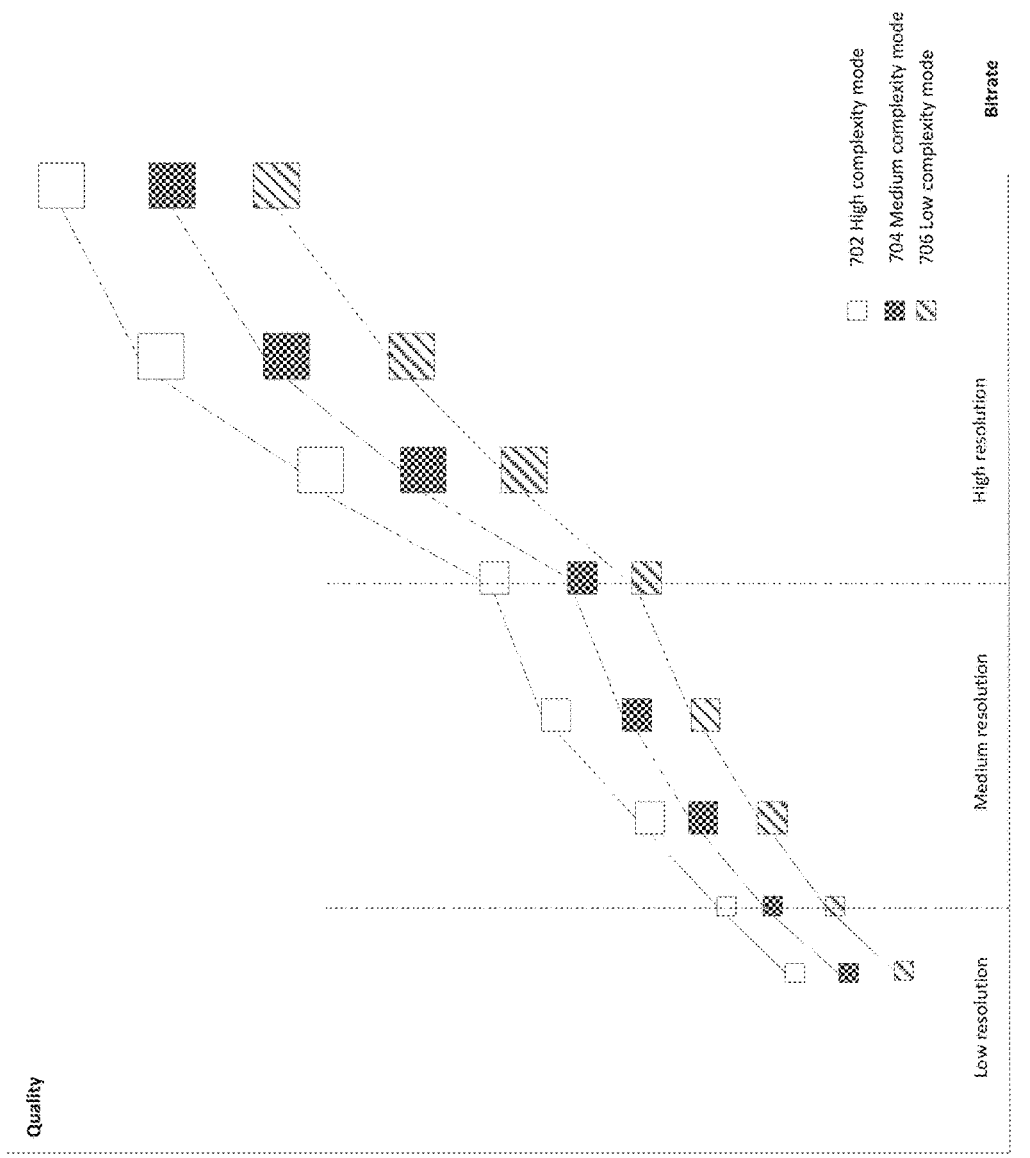
FIG. 6 depicts example contents that may be generated at the server side by considering resolution, bitrate, and complexity.

FIG. 5 is a block diagram illustrating an example power aware streaming system 600. The power aware streaming system 600 may include a power aware video encoder 602, a complexity aware MPD 800, a power aware adaptation control module 604, and/or a power sensing module 606. The power aware adaptation control module 604 and/or the power sensing module 606 may be implemented in, for example, a power aware streaming client 608. A power aware video encoder 602 may generate various versions of video segments with different complexity levels. FIG. 6 depicts a graph comparing example contents that may be generated at the server side by considering resolution, bitrate, and complexity. In the example shown in FIG. 6, a number of complexity levels may be available for a bitrate, such as at 702, 704 and 706.

Figure 7:
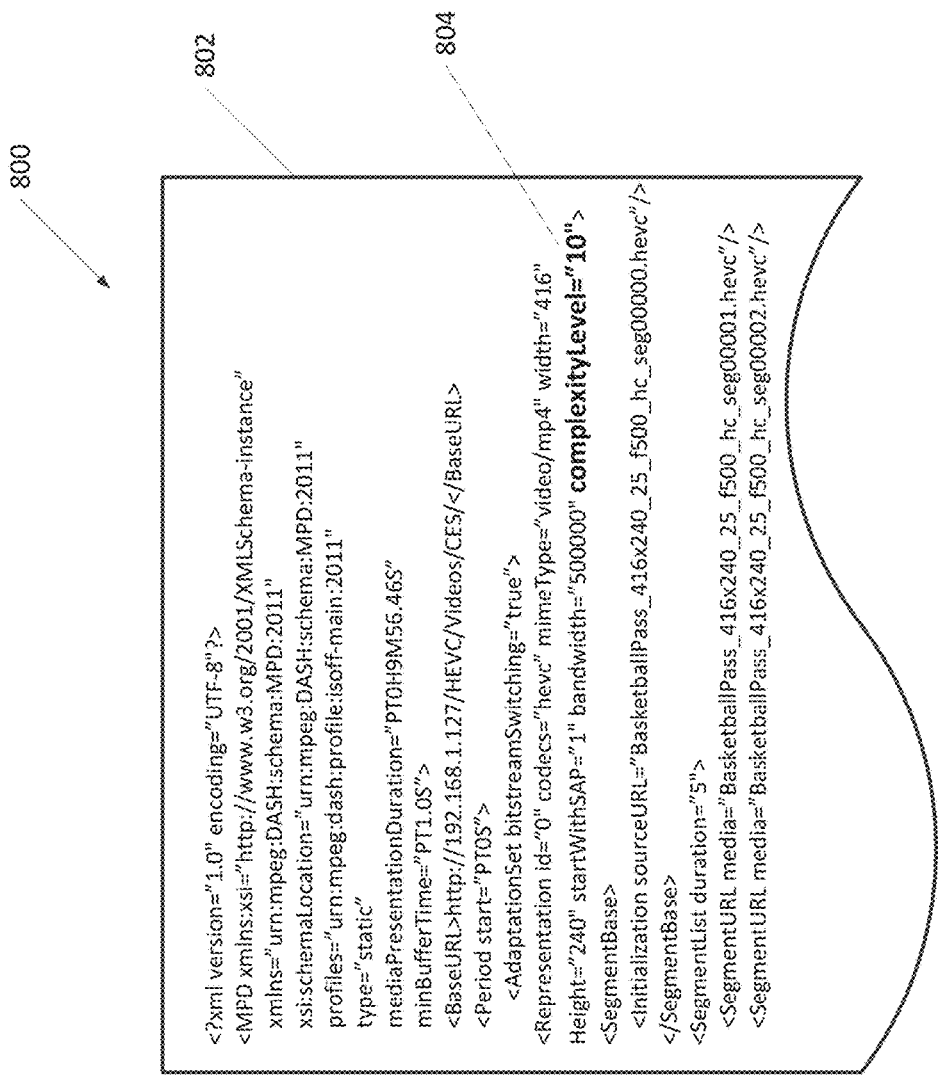
FIG. 7 depicts an example of a complexity aware media presentation description (MPD) file.

In a video streaming system using DASH technology or other similar HTTP streaming technologies, the complexity level information may be added in an MPD file, media description file, or other types of manifest file that may be signaled to a client. FIG. 7 illustrates an example of a complexity aware MPD file 800. A description 802 of a representation element may include a complexityLevel attribute 804 that may indicate a bitstream complexity level.

Although the MPD file or other types of manifest files may be used as an example in this disclosure to carry the complexity information, persons skilled in the art will appreciate that other types of bitstream level or system level signaling may be used to carry the complexity information. For example, the complexity information may be embedded in video bitstreams using high level parameter sets such as Video Parameter Set (VPS), Sequence Parameter Set (SPS), and the like. Complexity information may be conveyed in an MPEG Media Transport (MMT). For example, complexity information may be coded as a property element in an MMT Asset, or it may be conveyed as an MMT message to clients. The Green MPEG Call for Proposals (CfP) may define metadata files that may be used to carry useful information to reduce power consumptions on the devices. Such metadata files may be used to convey the complexity information.

A power aware adaptation control at the client side may adaptively choose segments for a receiver according to information that may be obtained from bandwidth sensing, power sensing, and/or CPU load status. The adaptation logic may promote full-length playback using the remaining battery power on a device; achieving acceptable, e.g., the improved video quality; satisfying the currently available bandwidth; and/or achieving CPU load balancing.

Referring again to FIG. 5, power adaptation logic 604 may be customized based on objectives of different applications. For example, the power adaptation logic 604 may be used in a variety of use cases such as if the user configures the client to a quality mode. If the user prefers quality over power, the power adaptation logic 604 may prioritize full-length playback with the remaining power and the best available video quality. If the user configures the client to a load balance mode, e.g., in a multitasking environment, the power adaptation logic 604 may prioritize full-length playback within the processor load budget. If the user configures the client to a power saving mode, e.g., if the user prefers to conserve the remaining battery power, the power adaptation logic 604 may prioritize full-length playback within the processor load budget and/or consuming as little power as possible.

Using a power sensing module 606 of FIG. 5, a power aware client 608 may measure a battery level (BL) and/or may determine battery usage. The power sensing module 606 may use an interface that may provide the current battery level. For example, the power sensing module 606 may periodically use a power management interface that may be provided, for example, by an operating system such as the Android operating system, which may indicate a remaining percentage of an entire battery capacity. The power sensing module 606 may use an interface that reports battery usage by an application or a process. For example, the Android operating system may have an interface that may provide power and processor usage statistics for one or more applications (e.g., an application) and/or the power usage for the display. The power sensing module 606 may determine power usage due to video decoding and display in a multi-task or multi-process environment. The power aware client 608 may then apply the power adaptation logic 604 to ensure efficient power usage. Adaptation may involve updating a power dissipation rate (PDR) and adapting a complexity level (CL) to satisfy configurable objectives.

The power dissipation rate (PDR) for a complexity level may be measured and updated periodically, for example, according to the equation:

$$PDR(k, t_j) = \begin{cases} PDR(k, t_i); & \text{if } (k \mathrel{!=} CL_i) \\ PDR(CL_i, t_i); & \text{else if } (BL_{t_j} == BL_{t_i}) \\ (BL_{t_i} - BL_{t_j})/(t_j - t_i); & \text{else if } (PDR(CL_i, t_i) == 0); \\ & k \in [CL_{MIN}, CL_{MAX}] \\ (1 - \alpha)PDR(CL_i, t_i) + \\ \alpha(BL_{t_i} - BL_{t_j})/(t_j - t_i); & \text{otherwise} \end{cases} \quad (1)$$

where k is the complexity level; $t_i$ is the time of the $i^{th}$ segment; $CL_{MIN}$ and $CL_{MAX}$ may be the minimum and maximum complexity levels, respectively, in the system;

$CL_i$ may be the complexity level of the $i^{th}$ segment; PDR $(CL_i, t_i)$ may be the PDR value of complexity level $CL_i$ at time $t_i$; $BL_i$ may be the remaining battery level at time $t_i$; and α may be the factor to control the updating speed, which may be set to, for example, 0.6, in which case a PDR value may be updated using equation (1) and may be a weighted combination of 0.6 times a current PDR observation and 0.4 times a previous PDR state. The value of α may satisfy 0≤α≤1. Larger values of α may be used to give more weight to the current PDR observation and may result in a faster updating speed, while smaller values of α may be used to give more weight to the past PDR history as represented by the previous PDR state, resulting in a slower updating speed. At a minimum, a value of α=0 may be employed so that an initial PDR observation may be used ongoing without further updating. At a maximum, a value of α=1 may be used so that the most recent PDR observation is always used, and any older PDR history is discarded. The PDR values of a complexity value (e.g., all complexity values) at the beginning of the video session may be initialized to 0. The PDR value of complexity levels may be updated. If the battery level does not change, then the PDR statistics may be kept. Otherwise, the PDR statistics may be updated accordingly.

When the complexity level (CL) may be adapted to satisfy configurable objectives, the amount of power requested to playback the remaining video with complexity level $CL_i$, denoted as $PC(CL_i, t_i)$ may be estimated as $$PC(CL_i, t_i) = PDR(CL_i, t_i) * (T - t_i) \quad (2)$$

where PDR may be calculated with equation (1) above and T is the total playback time.

The client may decide whether to switch up or down or to keep the current complexity level according to the customized objectives. The power adaptation logic 604 may try to achieve full-length video playback before the battery power may be exhausted.

Figure 8:
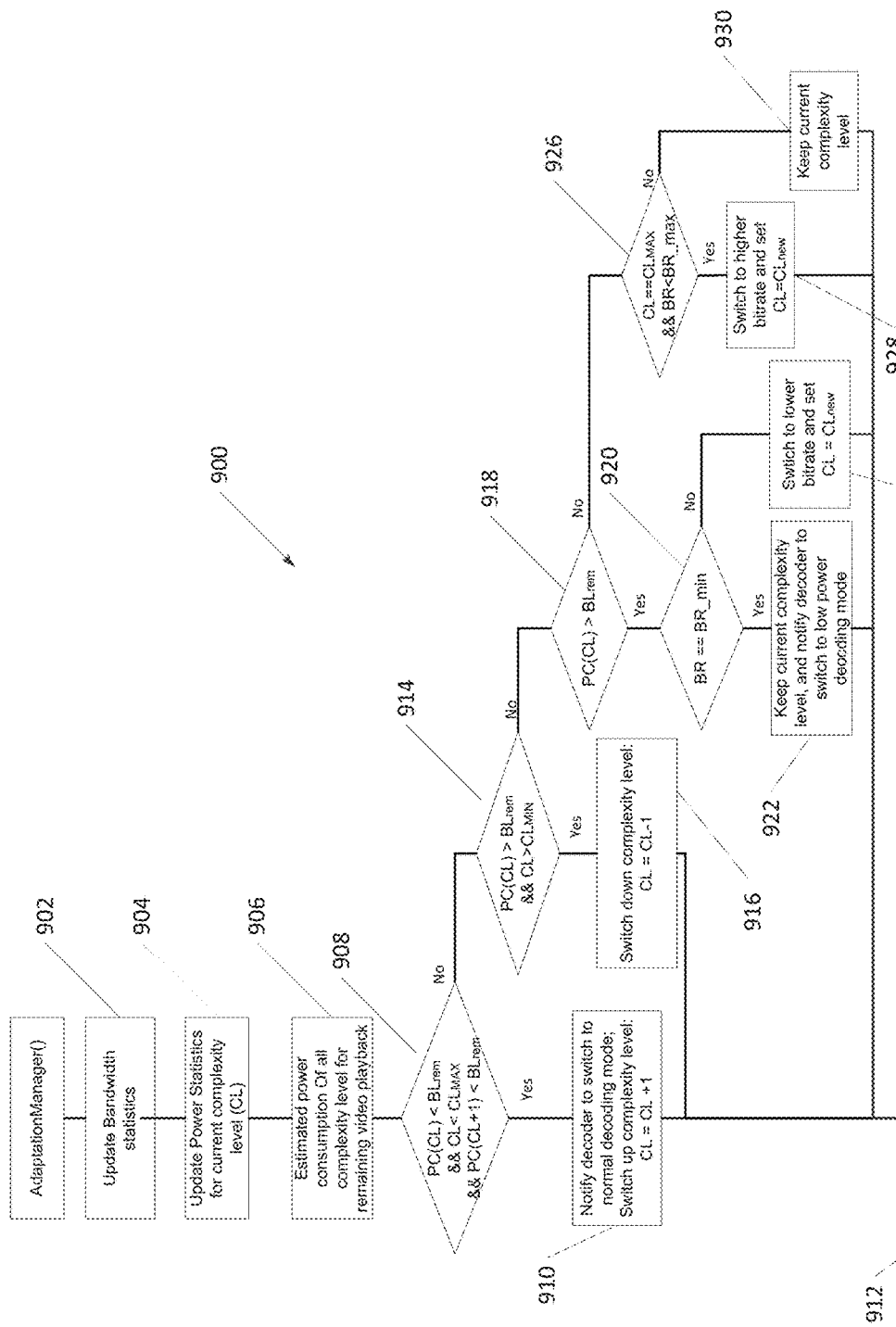
FIG. 8 depicts an example process that may be implemented by power adaptation logic for a quality mode.

FIG. 8 depicts an example process that may be implemented by power adaptation logic for a quality mode. For example, example process 900 that may be implemented by the power adaptation logic 604 (show in FIG. 5) for a quality mode, which may provide a video quality given the remaining battery level and the available bandwidth. At 902 and 904, respectively, the bandwidth statistics and the power statistics for a current complexity level (CL) may be updated. At 906, the power consumption (PC) may be estimated for a complexity level or complexity levels for the remaining video playback.

At 908, it may be determined whether the power consumption for the current complexity level may be less than the remaining battery life ($BL_{rem}$); whether the current complexity level may be less than the maximum complexity level; and whether the power consumption for the next higher complexity level may be less than the remaining battery life, e.g., whether it may be feasible to play the remaining video at the next higher complexity level given the remaining battery life. This may prevent the client from switching up and down too frequently and may promote smoother decoded video quality. This decision may be made based on the PDR learned from previous statistics during playback. If these conditions may be met, the decoder may be notified at 910 to switch to a normal decoding mode, and the complexity level may be switched upward. The segment may be downloaded at the adjusted complexity level and selected bitrate at 912.

If, at 908, it may be determined that a condition may not be true, it may be determined at 914 whether the power consumption for the current complexity level may be greater than the remaining battery life and whether the current complexity level may be higher than a minimum complexity level. If so, the complexity level may be switched downward at 916. The complexity level may be switched downward by switching to a next lower complexity level. This approach to switching down the complexity level may enable the complexity level to be switched down gradually to allow a smoother quality transition.

The complexity level may also be switched downward by searching for a complexity level for which the remaining power may be enough to playback the remaining video. This may be done using, for example, the following in Table 1:

TABLE 1

$k = CL_i - 1;$
While $(PC(k, t_i) > BL_{t_i} \ \&\& \ k > CL_{MIN})$
  $k = k-1;$ This approach may switch the complexity level downward more quickly to save more power. However, if this switching method erroneously decides to switch down too many levels, e.g., if the PDR estimation given by equation (1) may not be accurate enough, the power adaptation logic may decide later to switch the complexity level up again. Regardless of how the complexity level may be switched downward, the segment may then be downloaded at the adjusted complexity level and selected bitrate at 912.

Similarly, gradual or more aggressive logics may also be applied when the client decides whether to switch up complexity level or not. For example, a more gradual switch up method may switch up by one complexity level at a time, as shown in FIG. 8, whereas a more aggressive switch up method may switch up to the next highest complexity level that may be feasible. A more aggressive method may not only cause larger video quality changes due to more frequent switching, as in the case of switching the complexity level downward, but may also run a higher risk of using up the battery power before full-length playback may be achieved.

At 914, it may be determined that the power consumption for the current complexity level may not be greater than the remaining battery life, e.g., there may be insufficient battery power to playback the video at the current complexity level, or the current complexity level may not be higher than the minimum complexity level (e.g, the lowest complexity level available from the server is already being used). At 918 and 920 it may be determined whether the power consumption for the current (e.g. minimum) complexity level may be greater than the remaining battery life and/or whether the bitrate (BR) may be the minimum bitrate. If the lowest bitrate may be reached and the power consumption for the current (e.g. minimum) complexity level may be greater than the remaining battery life, e.g., there may be insufficient battery power to playback the video at the current (e.g. minimum) complexity level, at 922 the current (e.g. minimum) complexity level may be kept, and the decoder may be switched to a lower power decoding mode. For example, in-loop filtering, such as deblocking and/or SAO in HEVC may be bypassed for non-reference frames. The segment may then be downloaded at the complexity level and bitrate at 912.

If the power consumption for the current complexity level may be greater than the remaining battery life, but the minimum bitrate may not have been reached, at 924 the bitrate may be switched to a lower bitrate, and the complexity level may be set to a new complexity level at the lower bitrate, for example, a higher complexity level or the highest complexity level at the lower bitrate. The segment may be downloaded at the new (e.g. higher or highest) complexity level and lower bitrate at 912.

If, at 918, it may be determined that the power consumption for the current complexity level may not be greater than the remaining battery life, it may be determined at 926 whether the complexity level may be the highest complexity level and the bitrate may be less than the maximum bitrate. If both of these conditions may be true, at 928 the bitrate may be switched to a higher bitrate, and the complexity level may be set to a new complexity level at the higher bitrate, for example, a lower or the minimum complexity level at the higher bitrate. If not, the current complexity level may be kept at 930.

Figure 9:
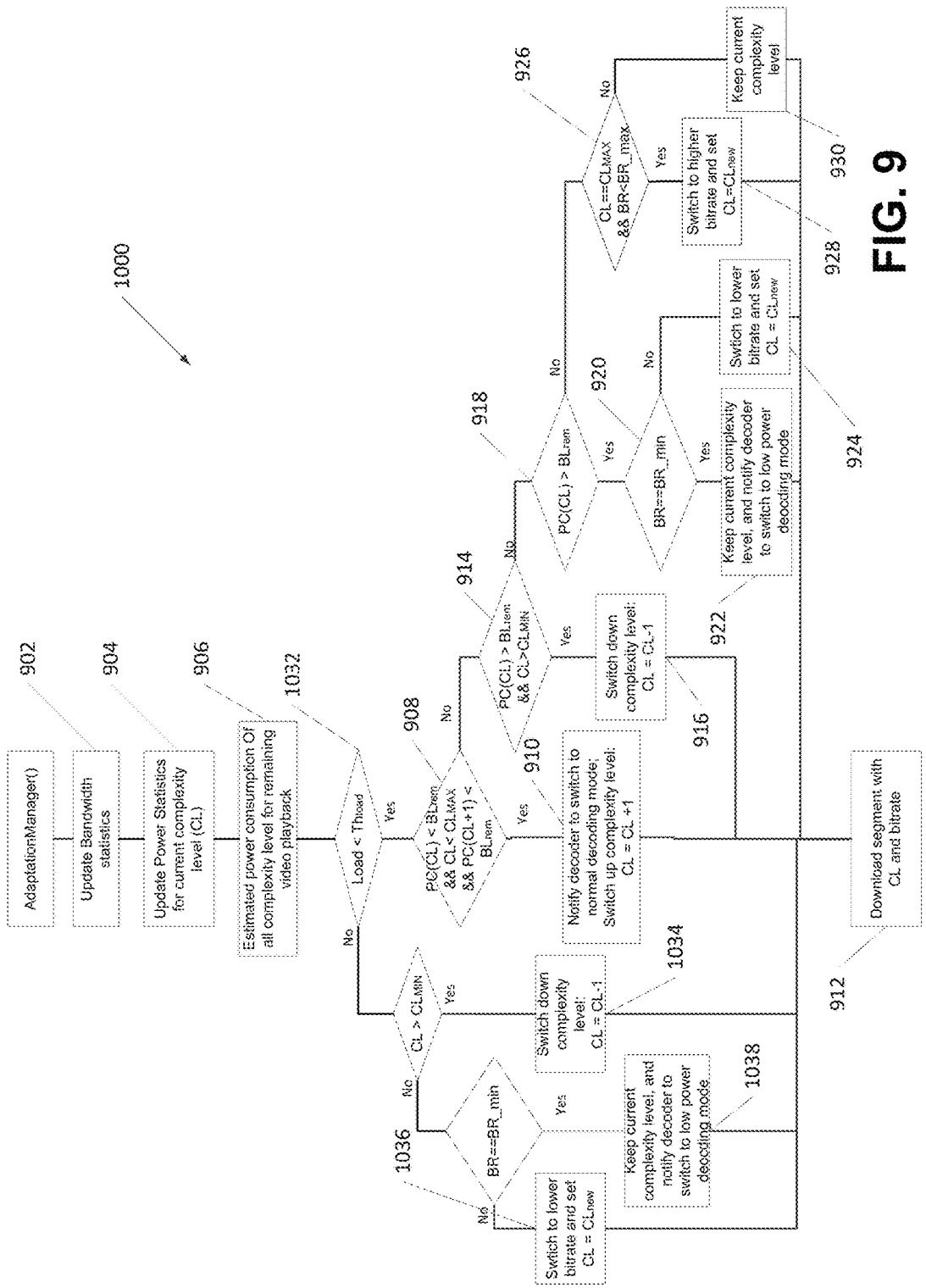
FIG. 9 depicts an example process that may be implemented by power adaptation logic for a multitasking environment.

FIG. 9 depicts an example process 1000 that may be implemented by power adaptation logic, such as power adaption logic 604 (shown in FIG. 5) for a multitasking environment. Some of the decisions and actions performed in the process 1000 may be similar to decisions and actions that may be performed in the process 900 and may be indicated by similar reference numerals. The process 1000 may involve a number of decisions and actions that may not be performed in the process 900. The process 1000 may involve decisions and actions that may be used by the client to balance the system load while trying to provide full-length playback. Before checking remaining power, at 1032, the client may check if the system may be overloaded or not by measuring average CPU usage during a short period. If the system may be overloaded, it may switch down the complexity level at 1034 until the complexity level reaches a minimum bound $CL_{MIN}$. If the system may still be overloaded at $CL_{MIN}$, the client may switch to a lower bitrate representation and may set the complexity level to a new complexity level (e.g., a higher or the highest complexity level) at 1036 if current bitrate may be greater than the lowest bitrate (BR_min). If the client reaches the lowest bitrate and the lowest complexity level, it may notify the decoder to apply a low complexity decoding mode at 1038 to reduce operations, for example, by skipping some in-loop filtering operations for non-reference frames. If the system processor may not be overloaded, then it may apply the same power aware adaptation logic as in the process 900 to provide the full-length playback. Though not shown in FIG. 9, when the system becomes overloaded, the client may switch down bit rates before it switches down complexity levels. For example, the client may switch to a lower bit rate before it may reach the minimum complexity level $CL_{MIN}$, or the client may ignore complexity levels and only switch to lower bit rates.

In a power saving mode, the client may choose the lowest complexity level at the lowest bitrate to minimize the power consumption during video playback. If the remaining power may not be enough for full-length playback, the client may notify the decoder to apply additional power saving decoding modes, such as those described herein.

If switching down to the available lower complexity and lower bitrate content versions may not reduce the complexity enough additional power saving modes may be employed within the logic of FIGS. 8 and 9. For example, some in-loop filtering may be skipped, processor switching frequency may be reduced, display power may be reduce, decoding some frames may be skipped, or the like.

Adaptation decisions may be based on factors such as the remaining battery level, the availability of multimedia content segments at different complexity levels and bitrates, and/or power dissipation states tracked by the decoder device. For example, the decoder device may track power dissipation states according to equation (1). The resulting power dissipation states $PDR(k,t_j)$ may provide a device-specific understanding of a power dissipation rate that may be expected for a number of complexity levels k.

Power dissipation states may be tracked, maintained, and used by a decoder device, such as a WTRU. Different content providers or content sources may use different algorithms to estimate complexity. Signaled complexity level values from one content source may map to different power dissipation rates than signaled complexity levels from a different content source. A decoder device may recognize this and may adapt to the use of different algorithms to estimate complexity.

Power dissipation data observed by a decoder device may be sparse, e.g., there may not be much data observable at a given complexity level. This may be true, for example, at the beginning of a streaming session (e.g., before the power dissipation states have been updated using enough observed data) and may be consistently true if the content provider signals complexity level values with fine granularity, e.g., Complexity Level (CL)=1, 2, 3, . . . 500.

A decoder device may have limited memory for state tracking. A decoder device may manage the state memory while still accurately tracking power dissipation states.

Figure 10:
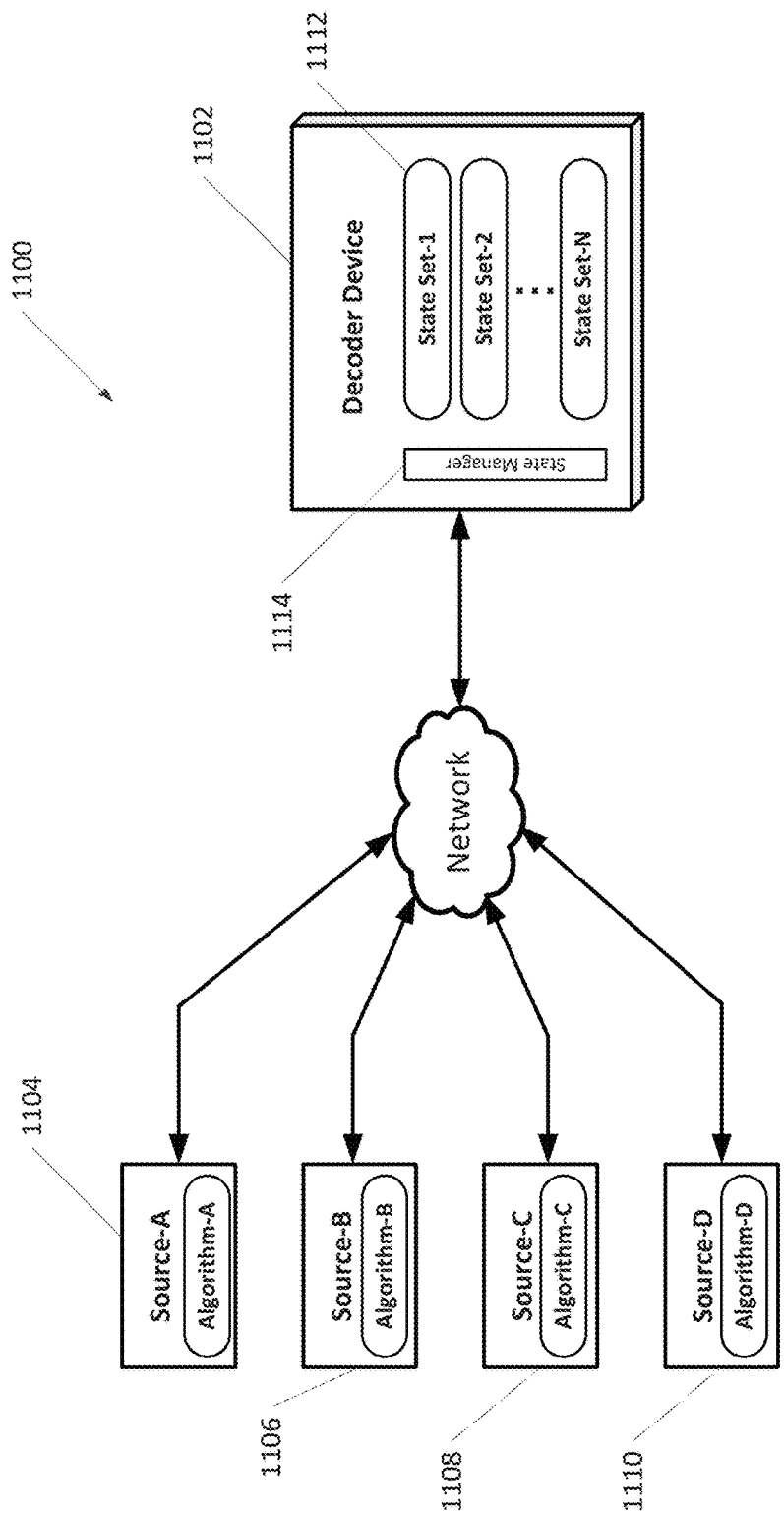
FIG. 10 depicts an example system in which a decoder device may stream media content from multiple different content sources.

FIG. 10 depicts an example system 1100 in which a decoder device 1102, e.g., a WTRU, may stream media content from multiple different content sources 1104, 1106, 1108, 1110. These content sources may be different content web sites, content providers, content services, etc. For example, a first source 1104 may be YouTube, and a second source 1106 may be CNN Video. The different content sources may provide multiple versions of content at different complexity levels and/or different bit rates, as described herein. Complexity level estimates may be provided for the available content versions. The media content from different content sources may have been encoded using different encoding tools. For example, the source 1104 may provide content encoded using a first video encoder, and the source 1106 may provide content encoded using a second video encoder. The different encoding tools may be provided by different encoder vendors, for example.

The complexity estimation algorithm may be standardized across content sources. However, as disclosed herein, a decoder device may track power dissipation states based on its own observations of battery usage when playing back video at the various signaled complexity levels. This may allow the decoder to interpret the complexity levels for different decoding resources in light of the power dissipation performance. The complexity estimation algorithm used by the content sources may not be standardized across content sources. A content source may customize a complexity estimation algorithm based on its own requests, and the complexity estimation algorithm may also be changed and improved over time. The decoder devices may adapt to changes in the complexity estimation algorithm.

Different content sources may provide complexity level estimates generated using different complexity estimation algorithms. The complexity level estimates provided by one content source may not be compatible with the complexity level estimates provided by a different content source. For example, a first content source may provide complexity level estimates using integers from 1 to 10, and a second content source may provide complexity level estimates using integers from 1 to 100. While different value ranges or complexity scales may make for incompatibility, other algorithm differences may also render the complexity estimates from one content source incompatible with the complexity estimates from another content source. For example, one content source may give a particular weighting to addition operations and a different weighting to multiplication operations when creating the complexity estimation value. Another content source may factor in the availability of specialized decoding hardware to the complexity estimate. A complexity level value (e.g., "ComplexityLevel=10") signaled by a first content source may correspond to one power dissipation rate, and the same complexity level value signaled by a second content source may correspond to a different power dissipation rate, from the point of view of a decoder device.

The decoder device 1102 may track multiple state sets that may correspond to different complexity estimation algorithms that may be used by different content sources. As illustrated in FIG. 10, the decoder device 1102 may have multiple state sets 1112, and may have a state manager component 1114 that may be used to create and manage the multiple state sets 1112. A multiple state set may comprise a set of power dissipation states computed from observations of power dissipation while decoding various segments of video at different advertised complexity levels. For example, a state set may have power dissipation states $PDR(k,t_j)$ as computed using equation (1). A state set may be constructed from power dissipation data observed during a single streaming session, or from data observed across multiple streaming sessions. For purposes of brevity, the $t_j$ may be omitted from the notation $PDR(k,t_j)$; accordingly, the notation $PDR(k)$ may represent a recent power dissipation rate states for complexity level k.

State sets may correspond to different content sources. For example, as shown in FIG. 10, a decoder device may maintain a different state set for a content source. Different state sets may correspond to different content web sites, content providers, or content services. For example, the decoder device may distinguish content sources using a domain name (e.g. youtube.com vs. cnn.com) and may maintain a different state set for each domain from which content may be streamed. The state set may be maintained across multiple streaming sessions, so that compatible observations may be collected to the proper state set. This technique may resolve issues of data sparsity, and may allow the decoder device to begin a streaming session with an already developed state model.

The decoder device 1102 may have a first streaming session in which content may be streamed from YouTube. In response, the state manager 1114 may create and initialize a new state set, and the state set may be progressively updated based on observations of the power dissipation rate in light of the complexity level labels provided by YouTube for the various content segments. The power dissipation states may be updated during the first streaming session using Equation (1), for example. The decoder device may end the first streaming session and may engage in other streaming sessions with other content sites resulting in additional (e.g., separate) state sets being created or updated. The decoder device may have a second streaming session in which content may be streamed from YouTube. The decoder device may recognize that a state set for YouTube may exist. For example, the decoder device may match the domain name (youtube.com) from the new streaming session to the same domain name associated with an existing state set. Based on this recognition/matching, the decoder device may utilize the existing YouTube state set for the second streaming session. For example, the decoder device may begin the second streaming session with the developed power dissipation states from the existing state set. The decoder device may use these previously stored power dissipation states to drive adaptation decisions from the beginning of the second streaming session. The decoder device may progressively update the existing state set using power dissipation rate observations from the second streaming session, e.g., based on equation (1).

State sets may correspond to different complexity estimation algorithms, regardless of the content source. For example, a first content source may provide content encoded using a third party encoding tool, such as the Acme Encoder v1.0, and this encoding tool may have a built-in algorithm to estimate the complexity of the video segments it encodes. A second content source may provide different content encoded using the same third party encoding tool. The first content source and the second content source (e.g., two different content sources) may provide complexity level estimates produced by the same complexity estimation algorithm, such as the complexity estimation algorithm embedded in the third party encoding tool. An identifier, e.g., a complexity estimation identifier (CEID), may be provided to the decoding device together with the complexity level estimates so that the decoding device may distinguish different complexity estimation algorithms. The decoding device may create and/or maintain a different state set for each different complexity estimation algorithm it may encounter, regardless of the content source.

The CEID may be, for example, an identification string or number that identifies a complexity estimation algorithm. The CEID may be assigned by a registration authority. Alternately, the CEID may be created, assigned, or randomly generated by the provider of the complexity estimation algorithm. For example, the provider may generate an identification string, e.g., "Acme-CEID-Version-1-0-5" or a Globally Unique Identifier (GUID) number. e.g., "138294578321" to distinguish complexity estimates provided by a particular version of Acme video encoding software. Such a GUID number may be random. The provider may provide a different identification string or a different random number to distinguish complexity estimates provided by a different version of its software. The provider may make the CEID available to the content source that uses the encoding software so that the content source may signal the CEID to the decoder device together with the complexity level estimate values. This may be done in an automated way. For example, a version of the encoder software may be aware of the CEID corresponding to the complexity level estimation algorithm embedded in the software, and the software may output the CEID along with the complexity level estimates when encoding content. The software may be capable of generating raw data for inclusion in an MPD file advertising the encoded content, or may be capable of generating the MPD itself. The data or the MPD produced by the software may include the CEID in addition to the complexity level estimates. A field (e.g., ComplexityEstimationAlg="Acme-CEID-Version-1-0-5") may carry the CEID within the MPD or within another suitable signaling channel.

A decoder device may recognize the same CEID when streaming content from different content sources, may recognize that the complexity level estimate values associated with such content were produced by the same complexity estimation algorithm, and may utilize the same state set for content with the same advertised CEID.

A decoder device may recognize that some content available from a content source may have been produced using a first complexity estimation algorithm corresponding to a first CEID, and that other content available from the same content source may have been produced using a second complexity estimation algorithm corresponding to a second CEID. The decoder device may use two different state sets to track power dissipation rates for content corresponding to the two different CEIDs. For example, a content site may update its encoding software and/or its complexity estimation algorithm on a certain date, such that content encoded before the date may be associated with one CEID, and content encoded after the date may be associated with a different CEID. A decoder device may recognize the two distinct CEIDs and may maintain two different state sets corresponding to the two different CEIDs.

A decoder device may utilize a state set when it encounters a CEID that it recognizes as associated with the state set. If the decoder device does not have a state set corresponding to a CEID it encounters while streaming, then the decoder device may create a state set associated with the newly encountered CEID.

A decoder device, e.g., a state manager on a decoder device, may have and/or may use management functions to reduce or limit the number of state sets that the decoder device tracks. For example, the management functions may detect when a state set may not have been used for a time period (e.g., unused for two weeks), or when a state set has been used seldomly (e.g., used two or fewer times in a three-month period). This may be the case, for example, if the content source may not be a popular content source or if the user of the decoder device infrequently streams from a particular content source. This may also be the case, for example, if the complexity estimation algorithm corresponding to a CEID may be used seldomly by content sources that the decoder device may be likely to encounter. The management functions may delete a state set which may be unused or used seldomly, thus saving memory on the decoder device.

A decoder device may have a limit (e.g., an upper limit) to the number of state sets it may track and/or to the amount of memory it may use for tracking state sets. The management functions may detect when such limits may be exceeded and may delete one or more state sets to bring the number of state sets or the memory used to store state sets back under the limit. The state sets may be deleted based on a reverse priority order; for example, the least frequently used state sets may be deleted first.

Deletion of state sets to reduce state set memory may be performed during a streaming session. For example, if a streaming session involves the creation of a state set, and creating the state set may cause the decoder device to exceed a maximum number of state sets, a management function may be called during the streaming session to delete the lowest priority (e.g., least frequently used) pre-existing state set to make room for the new state set. Deletion of state sets may be performed between streaming sessions or during idle periods.

The decoder device may delete a state set that may have been useful for a later streaming session. The decoder device may create a state set and begin tracking power dissipation states at the beginning of the streaming session. While the benefits of using a pre-existing state set may be lost in this case, the system may still function and may be able to make adaptation decisions based on the newly created state set.

State sets may be merged opportunistically. A decoder device may detect that two state sets may be similar so that the state sets may be merged. For example, two or more content sources may use the same complexity level estimation algorithm, but may not advertise CEIDs, such that the decoder device may not be able to tell from the top level signaling that the complexity level estimation algorithms may be the same. The decoder device may compare the two state sets and may determine similarity. If similarity may be determined, the decoder device may merge the two state sets and reduce the overall number of state sets maintained by the decoder device. Detection of similarity across state sets may be based on a variety of factors.

State sets may be sufficiently evolved to permit evaluation or comparison. For example, the decoder device may track the number of power dissipation observations used to construct a state set or the total playback time observed to construct the state set. The decoder device may apply a threshold to consider a state set mature enough for comparison. The threshold may be global to the state set. An example threshold may be that a state set may be mature enough to permit comparison when it has been updated using at least eight minutes of video playback. The threshold may be applied per power dissipation state. An example threshold may be that a state set is mature enough to permit comparison once a power dissipation state PDR(k) has been updated based on at least five video playback segments.

State sets may have compatible complexity level values to permit evaluation or comparison. For example, a first state set may evolve such that it may have states for PDR(k) with $k \in \{1,2,3, \ldots 10\}$. The first state set may be compared to a second state set that may also have evolved to have states for PDR(k) with $k \in \{1,2,3, \ldots 10\}$. It may be difficult to compare the first state set with a third state set that may have evolved to have states for PDR(k) with $k \in \{20,25,30,35,40, 45,50\}$. If two state sets may be produced based on a different set or a different range of signaled complexity level values, the underlying complexity estimation algorithms may not be directly comparable. Although not shown in FIG. 7, additional signaling may be added to the MPD and/or sent via external/alternative means to indicate the full range of complexity level values used by the server and/or the encoder. This may allow the device to more easily detect the full range of complexity level values (e.g., instead of having to make multiple observations of the complexity levels in multiple video segments) used by different content sources, servers, and/or encoders and to more easily assess the similarity of the underlying complexity estimation algorithms used by different content sources, servers, and/or encoders. If CEID is used, the full range of complexity levels may be signaled together with each CEID.

State sets may be compared using a suitable comparison metric. For a pair of state sets where both state sets may be sufficiently evolved for comparison, and both state sets may have compatible complexity level values, the state sets may be compared using a comparison metric. For example, the power dissipation states may be put in vector form and a norm of the difference between the two state vectors may be computed. The norm may be an $L^1$ norm or an $L^2$ norm, for example. The norm of the difference may be compared to a threshold, and if the norm may be under a threshold, the two state sets may be considered similar enough that the state sets may be merged. Other comparison metrics may be used. For example, a decoder device may compute a difference between corresponding states of one state set and another state set, and may compare this metric to a threshold in order to determine whether two state sets may be sufficiently similar to merge.

In some cases, state sets may be compared if they may be produced based on different sets or different ranges of signaled complexity level values to account for the possibility that some states of a state set may not yet have any data observations or may have insufficient data observations to be considered a reliable metric for power dissipation at a signaled complexity level. For example, a state set may have mature state values for PDR(k) with k∈{1,2,3,4,5,7,8,9,10}, but may have insufficient data or no data to update the state for k=6. Despite having a state without data, the remaining mature states may sufficiently characterize the state set to allow comparison with other state sets.

In such cases, the state set may be compared to other state sets. For example, states that may not be mature or that may not be available in either of the two state sets under comparison may be removed from the comparison, and corresponding states that may be mature (e.g., that may have been updated using a small amount of data, such as a minimum amount of data, for example, as determined by a threshold) may be compared in order to determine the similarity. For example, if the state for k=6 is determined to be not mature or not available in a first state set, the first state set may be compared to a second state set by removing the state value for k=6 from both state sets, and comparing the resulting reduced state sets using a comparison metric (e.g., the $L^2$ norm of the difference between the reduced state set vectors). States that may not be mature or that may not be available in a state set may be interpolated from neighboring states that may be mature in the same state set. For example, linear interpolation may be used to fill in missing or immature states to allow a full comparison to another state set to be made.

If a decoder device determines sufficient similarity between state sets (e.g., as disclosed herein), then the decoder device may merge the state sets. This may reduce the total number of state sets tracked by the decoder device, which may save memory.

The data for a state of the two state sets to be merged may be averaged to produce a corresponding state of the merged state set. This may be done as a simple average, or it may be done as a weighted average, e.g., $$PDR_{merged}(k) = A \cdot PDR_1(k) - B \cdot PDR_2(k)$$

The weights A and B may allow weighting based on how much data may have been used to construct the component state sets. For example, if 28 minutes of video data may have been used to construct and update the first state set corresponding to $PDR_1(k)$, and 12 minutes of data may have been used to construct and update the second state set corresponding to $PDR_2(k)$, then the weights may be computed as a fraction of the total data, e.g., A may be 28/(28+12)=0.7, and B may be 12/(28+12)=0.3.

The merged state set may be associated with contexts that may have been valid for the component state sets that may have merged. For example, if a first state set corresponding to YouTube may be merged with a second state set corresponding to CNN video, the resulting merged state set may be associated with both YouTube and CNN video. The state sets may be associated with contexts, for example, via domain names, content service names or identifiers, and/or CEIDs as disclosed herein. A merged set may correspond to more than two such contexts, as may be the result of multiple merges. When a merged state set may be created and associated with appropriate contexts, the component state sets that contributed to the merge may be deleted.

The decoder device or its state manager may perform state set comparisons and merging during a streaming session (e.g., in reaction to the current state set in use evolving to a point where it may be mature enough for comparison, or to a point where it may be sufficiently similar to another existing state set to be merged). Comparisons and merging may be done outside of an active streaming session, e.g., periodically as a housekeeping activity or during idle periods.

Merging of state sets may reduce the overall state set memory requirements, and may reduce the number of distinct state sets that may be tracked by the decoder device. By combining the data from two or more similar state sets, issues of data sparsity may be resolved.

PDR states may be quantized. The state tracking technique described by equation (1) may assign a state to a complexity level k that may be signaled by a content source. For example, if a content source signals complexity levels k with k∈{1,2,3, . . . 10}, a state set may be produced with ten corresponding values, PDR(k) with k∈{1,2,3, . . . 10}. If a content source may use a fine granularity of complexity levels (e.g., complexity levels k with k∈{1,2,3, . . . 1000}), tracking a state for a possible complexity level may increase the memory used for tracking the state set, and may also result in a data sparsity issue. For example, the decoder device may not see enough data at a complexity level to reliably compute a corresponding power dissipation state.

The decoder device may quantize the complexity level space to a number of discrete bins. A bin may correspond to a power dissipation rate state. Data observations from multiple neighboring complexity levels may be fed into a bin, and the storage size and tracking complexity for a state set may be reduced and/or limited.

Figure 11:
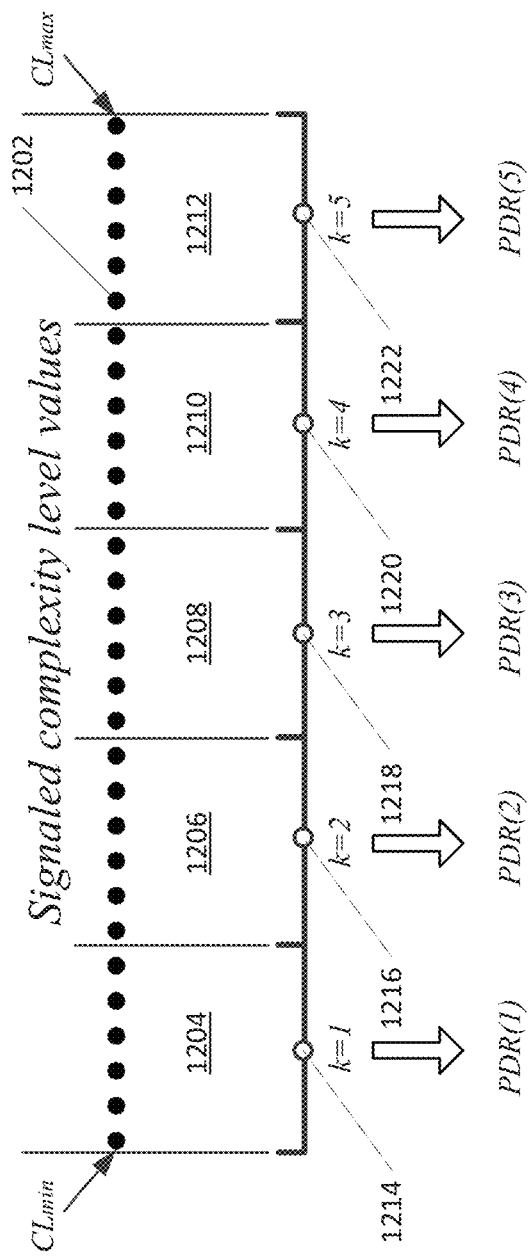
FIG. 11 depicts an example of quantizing complexity levels.

FIG. 11 depicts an example of quantizing complexity levels. As shown in FIG. 11, complexity levels 1202 that may be signaled by a content source may range from $CL_{min}$ to $CL_{max}$. The decoder device may divide this range into a number of bins, such as at 1204, 1206, 1208, 1210, and 1212. While FIG. 11 illustrates an example of five bins 1204, 1206, 1208, 1210, 1212, more or fewer bins may be used. For example, a larger number of bins (e.g., ten bins or twenty bins) may be used to characterize the relationship between complexity level and power dissipation rate.

The decoder device may request and/or receive a video segment associated with a signaled complexity level, CL. While playing back the video segment, the decoder device may observe the changing battery level and/or may compute a power dissipation rate for the playback of the video segment. The decoder device may map the signaled complexity level to the appropriate bin, as illustrated in FIG. 11. The decoder device may use the observed battery levels and/or the computed power dissipation rate to update a power dissipation state corresponding to the mapped bin. The update may be done according to equation (1), with the appropriate mapping of signaled complexity level CL to mapped bin k.

A state set with a small number of states (e.g., five states as shown in FIG. 11) may be produced from a more dense set of complexity levels signaled by a content source. A value PDR(k) from this small state set may correspond to the power dissipation rate for the complexity level (CL) value in the center of a bin k. This may be illustrated in FIG. 11 by the unfilled circles 1214, 1216, 1218, 1220, 1222 at the center of a bin. The values PDR(k) may be used to predict the power dissipation rates corresponding to the bin centers. To predict power dissipation rates corresponding to other values of CL, interpolation may be employed. For example, linear interpolation or polynomial interpolation may be used to interpolate between neighboring values of PDR(k). A reduced state set may be used to predict power dissipation rates for any signaled value of CL, and the reduced state model may be used to drive adaptation decisions. Although not shown in FIG. 11, non-uniform quantization of the full range of complexity level values may be used. For example, finer quantization may be applied to the complexity level values in the middle (that is, the middle bins may be mapped to a small number of complexity levels, for example 3 complexity level values instead of 6 complexity levels as shown), and coarser quantization may be applied to the complexity level values on the left/right sides (that is, the left/right side bins may span a larger number of complexity levels, for example 9 complexity level values instead of 6 complexity levels as shown).

Figure 12:
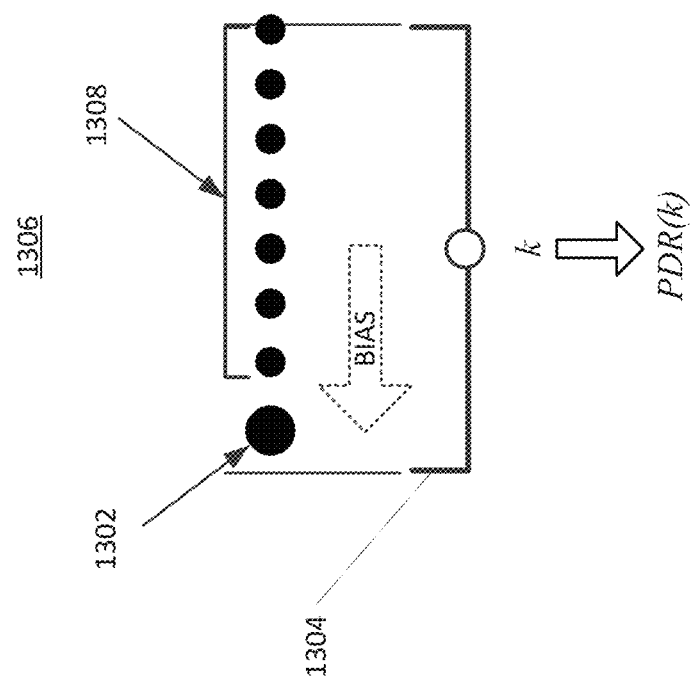
FIG. 12 depicts an example of bias in computation of power dissipation state using a reduced state set.

The alignment of complexity values relative to bin dividers may introduce a bias into the power dissipation rate updates when a reduced state set model may be used. The frequency of use of complexity levels may introduce a bias. For example, as illustrated in FIG. 12, a signaled complexity level 1302 aligned near an edge 1304 of a bin 1306 may be played back frequently during the evolution of the reduced state set, while other signaled complexity levels 1308 within the bin 1306 may be played back less frequently. The data used to represent the bin 1306 may be biased toward one side of the bin 1306, and the resulting state value PDR(k) may not accurately represent the center of the bin 1306.

Figure 13:
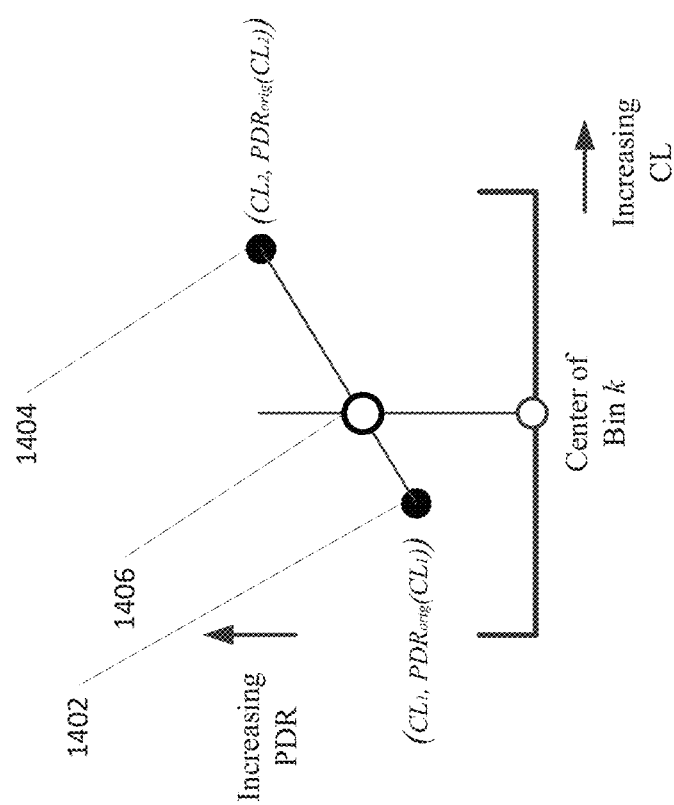
FIG. 13 depicts an example of interpolation for reducing or eliminating bias when updating power dissipation states of a reduced state set.

To reduce or eliminate this source of bias, the observed or computed values of battery level change or power dissipation may be remapped to equivalent values corresponding to the center of bin k, before using such values to update the power dissipation rate state PDR(k). For example, the decoder device may store observations of complexity level CL and power dissipation rate $PDR_{orig}(CL)$ corresponding to the original complexity level space. As shown in FIG. 13, the decoder device may use interpolation to interpolate between neighboring values 1402, 1404 of (CL, $PDR_{orig}$(CL)) to determine a mapped value 1406 of power dissipation rate corresponding to the center of bin k. This mapped power dissipation rate may be used to update PDR(k), the power dissipation rate state corresponding to bin k of the reduced state set.

While FIG. 13 illustrates the use of linear interpolation, other types of interpolation (e.g., polynomial interpolation, etc.) may be used. Interpolation may be used to remap an original power dissipation rate to an equivalent rate at the center of the bin. For example, a decoder device may interpolate between a power dissipation rate observation and a power dissipation rate state value of a neighboring bin. In FIG. 13, this may correspond to replacing ($CL_2$, $PDR_{orig}$($CL_2$)) on the right side of the interpolation with ($CL_{equiv}$(k+1), PDR(k+1)), which may correspond to the equivalent complexity level and the power dissipation rate at the center of the next higher bin. Interpolation may be done using either the next higher bin (e.g., k+1) or the next lower bin (e.g., k−1), depending on whether the current complexity level observation $CL_1$ is to the left or right, respectively, of the center of bin k. Remapping to the center of bin k may be performed without storing multiple power dissipation rate values.

A decoder device may use approaches disclosed herein to develop multiple reduced state sets having the same number of reduced state sets N. For example, the decoder device may create and maintain multiple state sets (e.g., corresponding to different content sources), where a state set may be a reduced state set comprising state values PDR(k), k∈{1,2,3, . . . N}. Because state sets may be based on the same reduced set of complexity levels k, the state sets may be more easily compared for merging. Pairs of state sets of the order-N reduced state sets may have compatible complexity level values that may permit evaluation or comparison. Comparison for potential merging may be performed for pairs of the order-N reduced state sets that may have sufficiently mature data to permit a comparison.

Figure 14A:
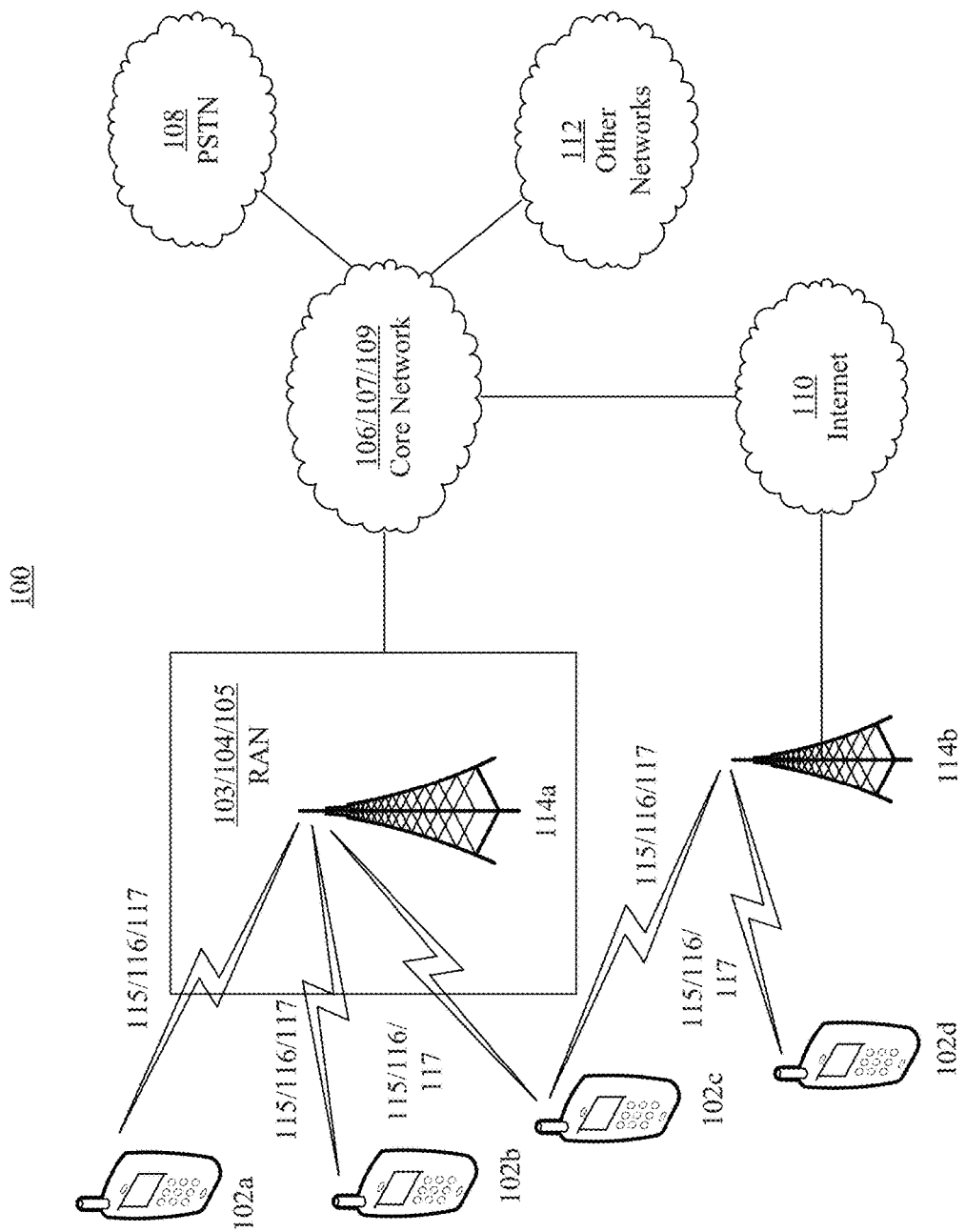
FIG. 14A is a system diagram of an example communications system in which one or more disclosed embodiments may be implemented.

FIG. 14A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 14A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 14A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 14A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 14A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 14A may be configured to communicate with the base station 114a, which may employ a cellular-based radio technology, and with the base station 114b, which may employ an IEEE 802 radio technology.

Figure 14B:
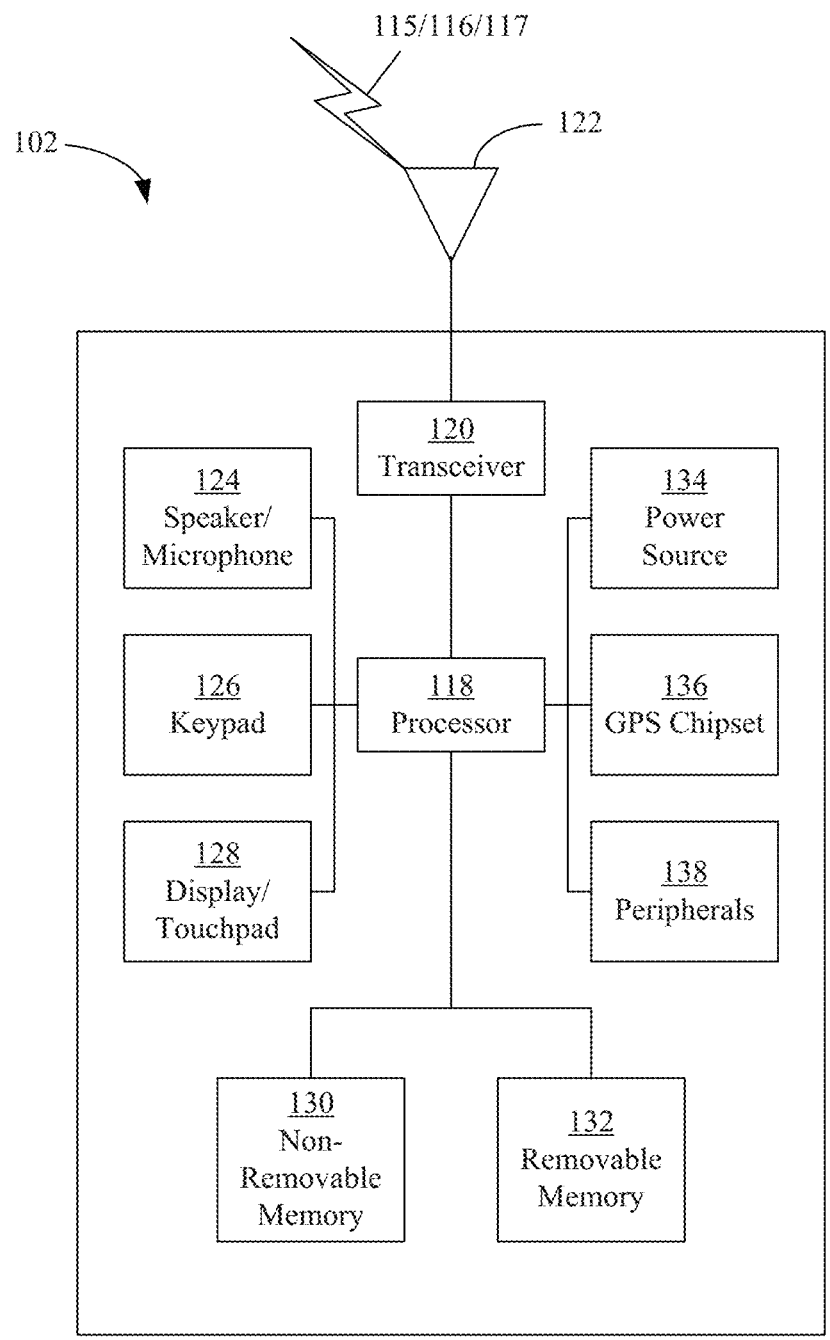
FIG. 14B is a system diagram of an example wireless transmit/receive unit (WTRU) that may be used within the communications system illustrated in FIG. 14A.

FIG. 14B is a system diagram of an example WTRU 102. As shown in FIG. 14B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 14B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 14B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 14B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that may not be physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14C:
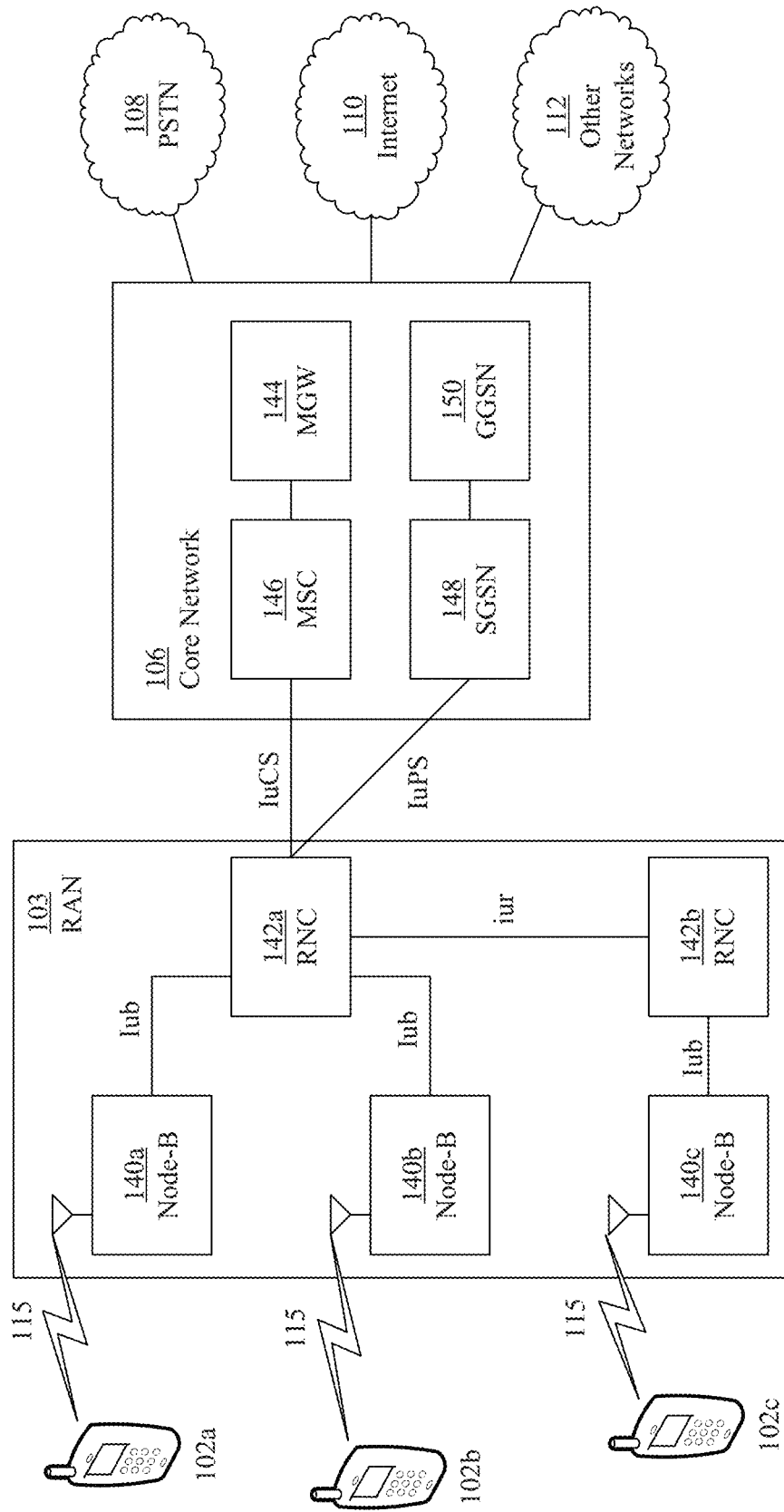
FIG. 14C is a system diagram of an example radio access network and an example core network that may be used within the communications system illustrated in FIG. 14A.

FIG. 14C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 14C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 14C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 14C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 14D:
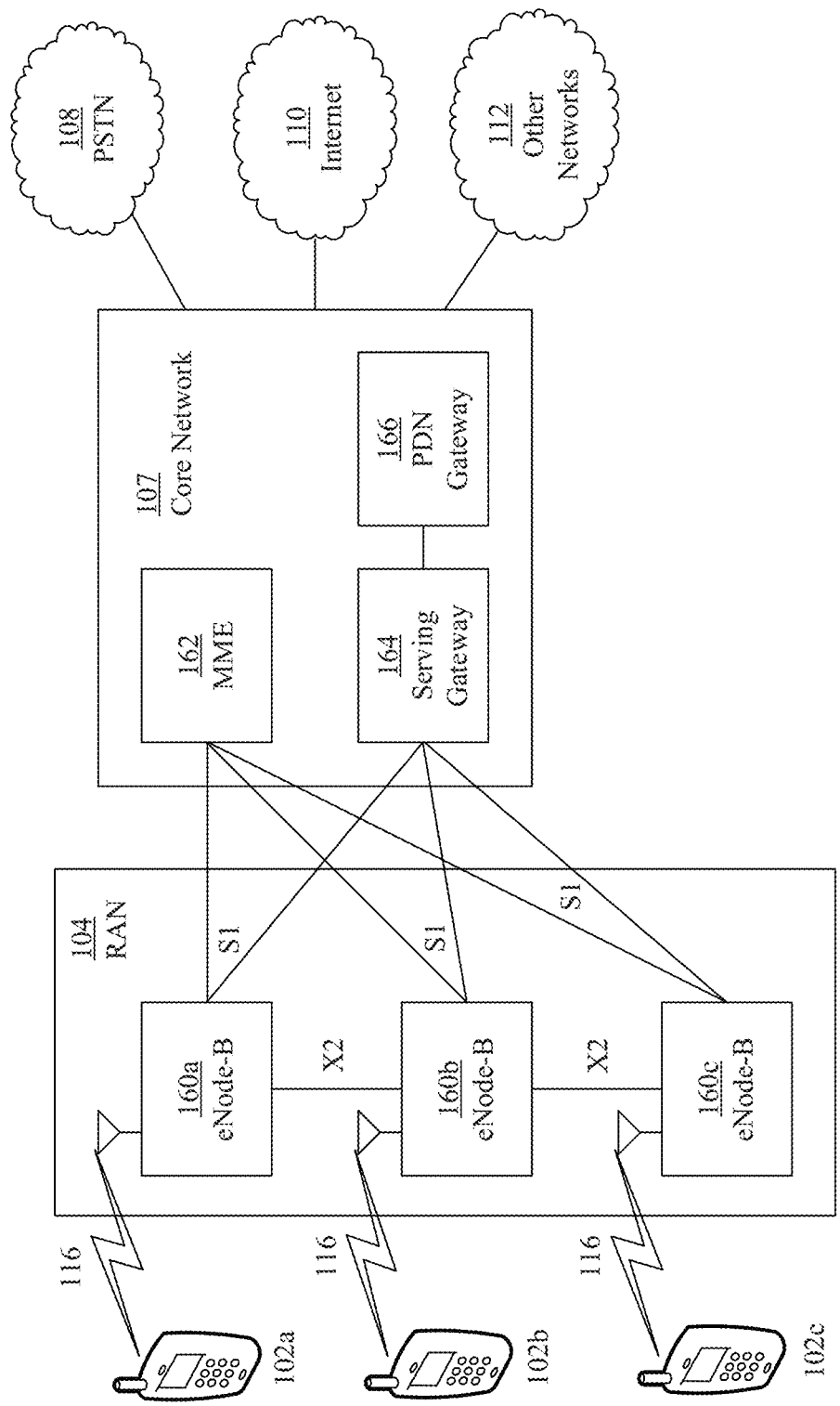
FIG. 14D is a system diagram of an another example radio access network and another example core network that may be used within the communications system illustrated in FIG. 14A.

FIG. 14D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 14D, the eNode-Bs 160a, 160b, 160c may communicate with one another over an X2 interface.

The core network 107 shown in FIG. 14D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 14E:
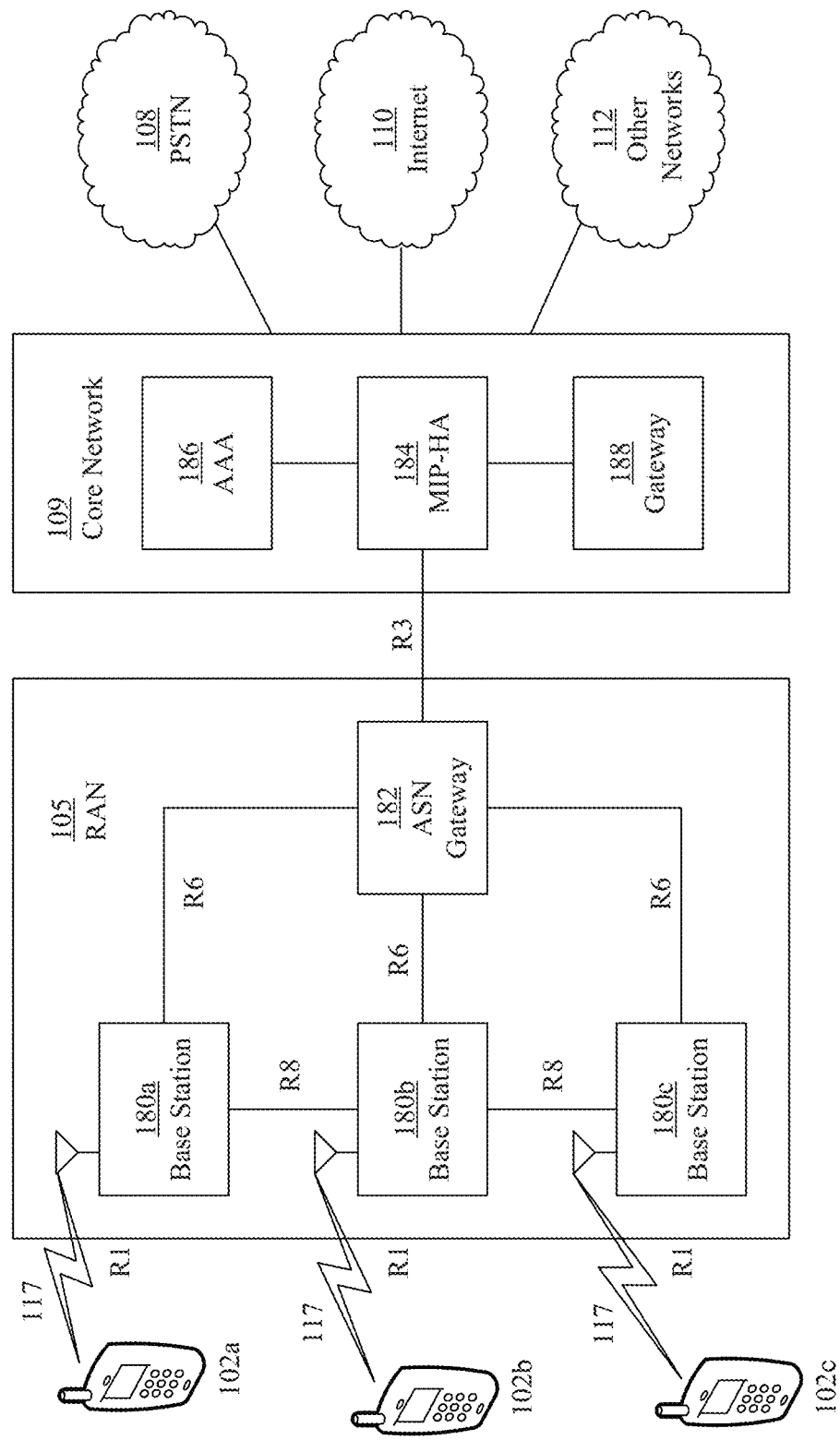
FIG. 14E is a system diagram of an another example radio access network and another example core network that may be used within the communications system illustrated in FIG. 14A.

FIG. 14E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 14E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 14E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 14E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The processes and instrumentalities described herein may apply in any combination, may apply to other wireless technology, and for other services.

A WTRU may refer to an identity of the physical device, or to the user's identity such as subscription related identities, e.g., MSISDN, SIP URI, etc. WTRU may refer to application-based identities, e.g., user names that may be used per application.

Although features and elements are described above in particular combinations, one of ordinary skill in the art will appreciate that a feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU), the WTRU comprising:
a memory; and
a processor configured to:
receive a media presentation description (MPD) file for a video, the MPD file identifying a plurality of representations available for a media streaming session, each of the plurality of representations defining a plurality of video segments;
receive a metadata file indicating complexity information for the plurality of representations, the metadata file being a different file than the MPD file;
request a first video segment of a first representation;
decode the first video segment of the first representation;
determine a second complexity information using a first complexity information in the metadata file, the first complexity information being associated with the first representation;
determine a second representation for requesting a second video segment based on the second complexity information; and
request the second video segment of the second representation.

2. The WTRU of claim 1, wherein determining the second complexity information is further based on the decoding of the first video segment of the first representation.

3. The WTRU of claim 1, wherein the processor is further configured to determine the second representation for requesting the second video segment based on the complexity information for the plurality of representations in the metadata file.

4. The WTRU of claim 1, wherein the processor is further configured to determine the second video segment of the second representation using the MPD file.

5. The WTRU of claim 1, wherein the processor is configured to reduce operations based on the determination of the second complexity information.

6. The WTRU of claim 1, wherein the metadata file is a metadata file defined by moving picture experts group (MPEG) Green.

7. The WTRU of claim 1, wherein determining the second complexity information is further based on a power dissipated during a duration while decoding the first video segment of the first representation.

8. The WTRU of claim 7, wherein the processor is further configured to determine the second complexity information by determining that the first complexity information indicates that the second complexity information can increase video quality and that the WTRU has enough power to play the video using the second complexity information.

9. The WTRU of claim 1, wherein the processor is further configured to determine the second complexity information by:
determining a length of the video;
determining a power needed to play the video based on the first complexity information and the length of the video; and
determining the second complexity information based on the power needed to play the video.

10. The WTRU of claim 1, wherein the processor is further configured to determine the second complexity information by:
determining that the first complexity information indicates that a power used to play the video can exceed a remaining battery capacity; and
determining the second complexity information such that the video can be played within the remaining battery capacity.

11. A method performed by a wireless transmit/receive unit (WTRU), comprising:
receiving a media presentation description (MPD) file for a video, the MPD file identifying a plurality of representations available for a media streaming session, each of the plurality of representations defining a plurality of video segments;

receiving a metadata file indicating complexity information for the plurality of representations, the metadata file being a different file than the MPD file;

requesting a first video segment of a first representation;

decoding the first video segment of the first representation;

determining a second complexity information using a first complexity information in the metadata file, the first complexity information being associated with the first representation;

determining a second representation for requesting a second video segment based on the second complexity information; and requesting the second video segment of the second representation.

12. The method of claim 11, wherein determining the second complexity information is further based on the decoding of the first video segment of the first representation.

13. The method of claim 11, wherein determining the second representation for requesting the second video segment is further based on the complexity information for the plurality of representations in the metadata file.

14. The method of claim 11, further comprising determining the second video segment of the second representation using the MPD file.

15. The method of claim 11, further comprising reducing operations based on the determination of the second complexity information.

16. The method of claim 11, wherein the metadata file is a metadata file defined by moving picture experts group (MPEG) Green.

17. The method of claim 11, wherein determining the second complexity information is further based on a power dissipated during a duration while decoding the first video segment of the first representation.

18. The method of claim 17, wherein determining the second complexity information is further based on determining that the first complexity information indicates that the second complexity information can increase video quality and that the WTRU has enough power to play the video using the second complexity information.

19. The method of claim 11, wherein determining the second complexity information further comprises:

determining a length of the video;

determining a power needed to play the video based on the first complexity information and the length of the video; and determining the second complexity information based on the power needed to play the video.

20. The method of claim 11, wherein determining the second complexity information further comprises:

determining that the first complexity information indicates that a power used to play the video can exceed a remaining battery capacity; and determining the second complexity information such that the video can be played within the remaining battery capacity.

* * * * *